US008244988B2

(12) United States Patent
Cantin et al.

(10) Patent No.: US 8,244,988 B2
(45) Date of Patent: Aug. 14, 2012

(54) PREDICTIVE OWNERSHIP CONTROL OF SHARED MEMORY COMPUTING SYSTEM DATA

(75) Inventors: Jason F. Cantin, Austin, TX (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/432,835

(22) Filed: Apr. 30, 2009

(65) Prior Publication Data

US 2010/0281220 A1     Nov. 4, 2010

(51) Int. Cl.
*G06F 12/00* (2006.01)
(52) U.S. Cl. ........... 711/152; 711/144; 711/151; 365/49
(58) Field of Classification Search .................. 711/152, 711/151, 145, 144, E12.091, E12.023, E12.018; 365/49
See application file for complete search history.

(56) References Cited

U.S. PATENT DOCUMENTS

| | | | | |
|---|---|---|---|---|
| 6,625,698 | B2 * | 9/2003 | Vartti | 711/141 |
| 7,272,688 | B1 * | 9/2007 | Glasco | 711/141 |
| 7,337,279 | B2 * | 2/2008 | Glasco | 711/141 |

OTHER PUBLICATIONS

Tendler, J.M, Dodson, J.S., Fields, Jr., J.S., Le, H. and Sinharoy, B., IBM eServer Power 4 System Microarchitecture, Technical White Paper, IBM Server Group 2001, IBM J. Res. & Dev. vol. 46 No. 1 Jan. 2002, pp. 5-25. (21 pages).
Anderson, E., Brooks, J., Grassl, C. and Scott, S., Performance of the Cray T3E Multiprocessor, Cray Research, Inc., Proceedings of the 1997 ACM/ IEEE Conference on Supercomputing, 1997, pp. 1-17. (17 pages).
Lepak, K. and Lipasti, M., Reaping the Benefit of Temporal Silence to Improve Communication Performance, Department of Electrical and Computer Engineering, University of Wisconsin, International Symposium on Performance Analysis of Systems and Software, 2005. (11 pages).
Digital Equipment Corporation, VAX11 780 Hardware Handbook, 1979-80. (374 pages).

* cited by examiner

*Primary Examiner* — Richard Elms
*Assistant Examiner* — Hien Nguyen
(74) *Attorney, Agent, or Firm* — Wood, Herron & Evans, LLP

(57) ABSTRACT

A method, circuit arrangement, and design structure utilize a lock prediction data structure to control ownership of a cache line in a shared memory computing system. In a first node among the plurality of nodes, lock prediction data in a hardware-based lock prediction data structure for a cache line associated with a first memory request is updated in response to that first memory request, wherein at least a portion of the lock prediction data is predictive of whether the cache line is associated with a release operation. The lock prediction data is then accessed in response to a second memory request associated with the cache line and issued by a second node and a determination is made as to whether to transfer ownership of the cache line from the first node to the second node based at least in part on the accessed lock prediction data.

19 Claims, 8 Drawing Sheets

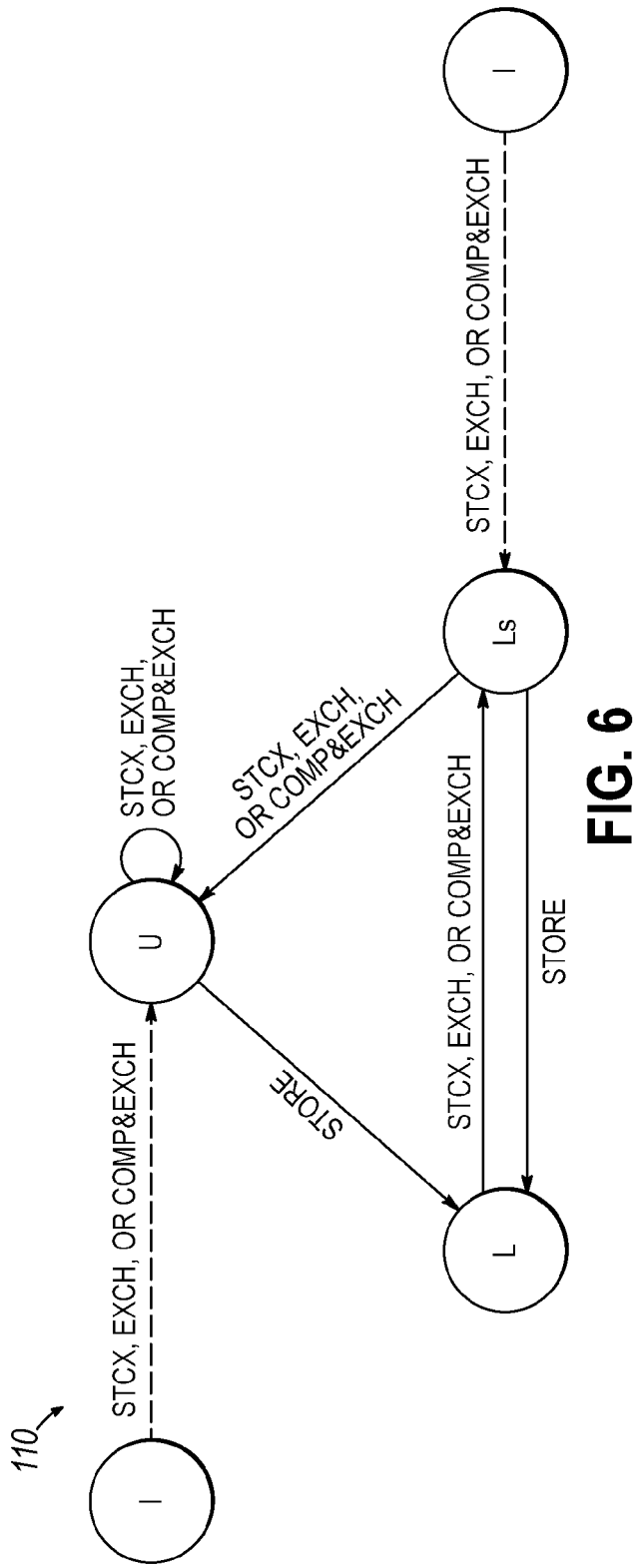

| Instruction Set | Lock Behavior | | Atomic Update Behavior | |
|---|---|---|---|---|
| PowerPC, MIPS, and Related Operation Sets | Acquire Operation | LARX STCX | Atomic Update Operation | LARX STCX |
| | Release Operation | STORE or STCX | | |
| x86, IA-64, SPARC, and Related Operation Sets | Acquire Operation | LOAD EXCH or COMP&EXCH | Atomic Update Operation | LOAD EXCH or COMP&EXCH |
| | Release Operation | STORE EXCH or COMP&EXCH | | |

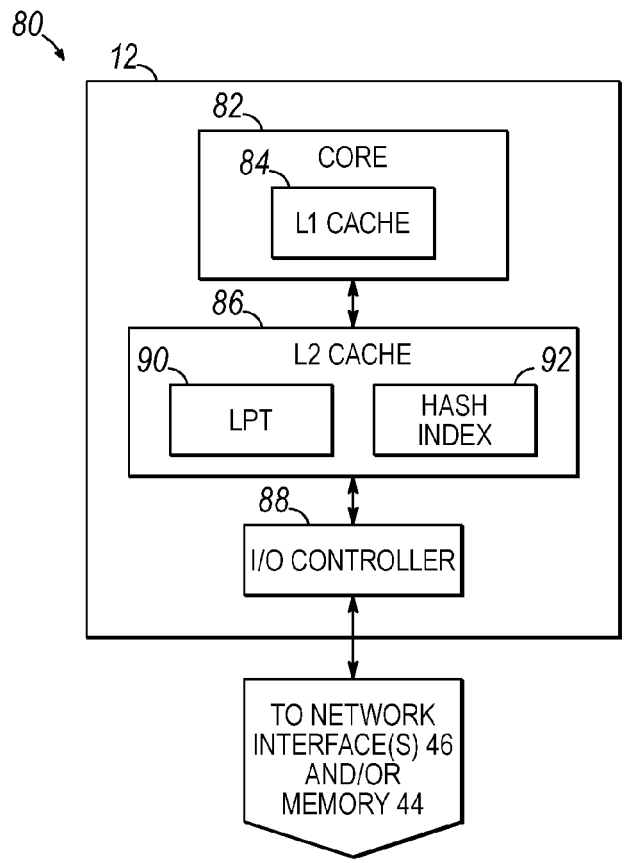
FIG. 4
| LPT | | | | |
|---|---|---|---|---|
| VALID BIT(S) | ADDRESS TAG | STATE BIT(S) | REPLACEMENT POLICY BIT(S) | SYNCHRONIZATION OPERATION DATA |
| | | | | |
| | | | | |
| | | | | |
| | | | | |
| | | | | |
| | | | | |
FIG. 5
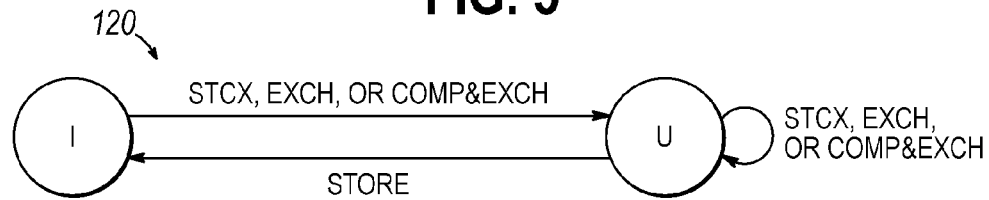
FIG. 7

PREDICTIVE OWNERSHIP CONTROL OF SHARED MEMORY COMPUTING SYSTEM DATA

FIELD OF THE INVENTION

The present invention relates to computing systems, and more particularly to tracking information about memory regions in a shared memory computing system.

BACKGROUND OF THE INVENTION

Computer technology continues to advance at a remarkable pace, with numerous improvements being made to the performance of both processing units—the "brains" of a computing system—and the memory that stores the data processed by a computing system.

In general, a processing unit is a microprocessor or other integrated circuit that operates by executing a sequence of instructions that form a computer program. The instructions are typically stored in a memory system having a plurality of storage locations identified by unique memory addresses. The memory addresses collectively define a "memory address space," representing an addressable range of memory regions that can be accessed by a microprocessor.

Both the instructions forming a computer program and the data operated upon by those instructions are often stored in a memory system and retrieved as necessary by the microprocessor when executing the computer program. The speeds of microprocessors, however, have increased relative to that of memory devices to the extent that retrieving instructions and data from memory often becomes a significant bottleneck on performance of the microprocessor as well as the computing system. To decrease this bottleneck, it is often desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories (e.g., multiple levels and possibly multiple types of memory) in a memory architecture to attempt to decrease costs with minimal impact on performance. Often, a computing system relies on a relatively large, slow and inexpensive mass storage system such as a hard disk drive or other external storage device, an intermediate main memory that uses dynamic random access memory (DRAM) devices or other volatile memory storage devices, and one or more high speed, limited capacity cache memories, or caches, implemented with static random access memory (SRAM) devices or the like. Information from segments of the memory regions, often known as "cache lines" of the memory regions, are often transferred between the various memory levels in an attempt to maximize the frequency that requested cache lines are stored in the fastest cache memory accessible by the microprocessor. Whenever a memory request attempts to access a cache line, or entire memory region, that is not cached in a cache memory, a "cache miss" typically occurs. As a result of a cache miss, the cache line for a memory address typically must be retrieved from a relatively slow, lower level memory, often with a significant performance penalty. Whenever a memory request attempts to access a cache line, or entire memory region, that is cached in a cache memory, a "cache hit" typically occurs and the cache line or memory region is supplied to the requester.

Cache misses in particular have been found to significantly limit system performance. In some designs, for example, it has been found that over 25% of a microprocessor's time is spent waiting for retrieval of cache lines after a cache miss. Therefore, any mechanism that can reduce the frequency and/or latency of data cache misses can have a significant impact on overall performance.

One conventional approach for reducing the impact of cache misses is to increase the size of the cache to in effect reduce the frequency of misses. However, increasing the size of a cache can add significant cost. Furthermore, oftentimes the size of the cache is limited by the amount of space available on an integrated circuit device. Particularly when the cache is integrated onto the same integrated circuit device as a microprocessor to improve performance, the amount of space available for the cache is significantly restricted.

Another conventional approach includes decreasing the miss rate by increasing the associativity of a cache, and/or using cache indexing to reduce conflicts. Although each approach can reduce the frequency of data cache misses, each approach still incurs an often substantial performance hit whenever cache misses occur.

Yet another conventional approach for reducing the impact of cache misses incorporates various prediction techniques to attempt to predict what data will be requested in the future, and prefetching that data into a cache. Thus, when the data is later requested, the data is already resident in the cache, and no cache miss will occur.

Conventional approaches for reducing the impact of cache misses, however, often introduce performance problems in shared memory computing systems. In a shared memory computing system, a plurality of microprocessors share a common memory, and whenever a microprocessor needs to read or write to a particular piece of data in that memory, the microprocessor must retrieve that piece of data into one of its caches. When the data is being accessed by the microprocessors, other microprocessors may also need to access that data as well, so a coherency protocol is required to ensure that the data is coherent for all of the microprocessors. With some protocols, multiple microprocessors may be permitted to own redundant copies of data in a shared state when none of the microprocessors intends to modify the data, i.e., when every microprocessor only intends to read the data. However, whenever a microprocessor needs to modify a piece of data, most coherence protocols require that that microprocessor obtain the data in an exclusive state, which effectively precludes any other microprocessor from accessing that data until the owning microprocessor releases ownership of the data to ensure that any modifications to the data made by the owning microprocessor can be propagated to the rest of the shared memory computing system. Thus, any time two or more microprocessors need to access the same data, one or more of those microprocessors may have to wait for another processor to release that data, thereby decreasing the performance of those stalled microprocessors.

Conventional coherence protocols typically use either a central directory or a snooping protocol, and track the status of data on a cache line by cache line basis. Such protocols require a microprocessor to broadcast a request over a shared memory bus, which results in a lookup being performed either in a central directory or in each individual node in the shared memory system to determine the status of the requested data (e.g., some or all of the data in the cache line), with the requested data ultimately returned to the requesting processor and the status of that cache line being updated to reflect the new ownership status of the cache line.

One difficulty encountered in shared memory computing systems often occurs when shared-memory computing systems attempt synchronization behaviors that include simple synchronization operations, such as lock behavior and atomic update behavior. In general, lock behavior uses a lock variable to guard access to some shared data during a critical section of a program such that other threads and processes cannot access that shared data. When a thread holding the lock variable has completed the critical section, it may issue a release operation to unlock the shared data. Consequently, with a lock behavior, the shared data, once locked, is protected from access by other threads or processes until it is released by a later release operation. Atomic update behavior, on the other hand, typically quickly updates shared data to make a small change to the shared data without the need for a lock variable or a separate release operation. Other mechanisms are often used to ensure that the update to the data is atomic. In general, an atomic update includes an operation in which the update is complete once the shared data's value has been modified, but that does not require a lock variable to prevent access to that shared data. In general, an atomic update appears to a computing system to be a single operation in which there are only two possible outcomes: success or failure.

In conventional shared memory computing systems, lock behavior and atomic update behavior often present problems for coherence, particularly those with migratory data optimizations, due to the inability for a coherence protocol to determine what type of behavior is being implemented by a program executing on a microprocessor, particularly when the same synchronization primitives are used to implement both types of behavior. In particular, migratory data optimizations typically utilize separate migratory and non-migratory modified states to indicate when data that is owned by one microprocessor in a modified state can be migrated to another microprocessor that needs to access the data. The ability to specify certain data as being non-migratory, in particular, is helpful for lock behavior, since performance would suffer if a cache line within which a lock variable is stored was set by one microprocessor and then migrated to another microprocessor before the lock variable was released by the first microprocessor. In such a situation, the first microprocessor would be required to request a modifiable copy of that cache line in order to release the lock variable. Given also that the likely reason that the second microprocessor attempted to access the cache line was to try to lock the same data (which would currently be locked by the first microprocessor), the second microprocessor, upon obtaining the cache line, would still need to wait on the first microprocessor to release the lock variable before it could obtain the lock. By specifying a cache line as non-migratory, therefore, the migration of the cache line from the first microprocessor to the second microprocessor and back would be avoided, thereby enabling the first microprocessor to release the lock, and the second microprocessor to obtain the lock, more quickly, and with lower overhead.

In contrast, with atomic updates, migration of data is not as much of a concern, since presumably once an atomic update has been performed by one microprocessor, that microprocessor does not need to access the data further in order to implement the behavior. Consequently, the data associated with an atomic update behavior often can be held in a migratory state. Placing such data in a non-migratory state just causes performance problems.

Because many conventional shared memory computing systems typically use the same synchronization primitives for lock behavior and atomic update behavior, however, it is often difficult to determine whether a cache line should be placed in a migratory or a non-migratory state. Many conventional shared memory computing systems are thus typically configured to be optimized for either lock behavior or atomic update behavior, but not both.

On the other hand, some conventional shared memory computing systems utilize synchronization primitives that are exclusively used for either lock behavior or atomic update behavior, but not both. However, many shared memory computing system applications are configured to operate across multiple types of conventional shared memory computing systems and thus would require recompilation to take advantage of those exclusive synchronization primitives, increasing the cost to produce and operate those applications while tying them to one type of conventional shared memory computing systems.

One conventional approach for determining whether to use lock behavior or atomic update behavior is temporal silence. In typical shared computing systems, lock variables that lock a cache line are often reverted back to their original value when released. Thus, a synchronization primitive to acquire a lock and a synchronization primitive to release a lock often form a temporally-silent pair. A first microprocessor may therefore be configured to retain stale copies of cache lines subject to lock behavior until those cache lines are the subject of a synchronization operation of a second microprocessor. However, temporal silence fails to benefit atomic-update behavior because there is not a lock variable that is set to a value and then subsequently reverted, as in a temporarily silent pair.

Another proposed approach for determining whether to use lock behavior or atomic update behavior includes adding extra bits to synchronization operation primitives such that shared memory computing system applications may be configured to label those synchronization primitives appropriately as involving either lock behavior or atomic update behavior. However, this change to the instruction set requires shared memory computing system applications to be recompiled and libraries to be re-written. Moreover, this approach may not be able to be implemented on all shared memory computing architectures, as additional bits are required with each synchronization operation primitive, which may in turn require additional bus lines, command lines, and control registers associated therewith to be configured for those primitives.

Consequently, a need continues to exist for optimizing performance of a shared memory computer system for both lock behavior and atomic update behavior in such a manner that does not require changes to instruction set architectures, is configured to operate with multiple instruction set architectures, and will benefit existing shared memory computing systems.

SUMMARY OF THE INVENTION

Embodiments of the invention provide a method, circuit arrangement, and design structure to control ownership of a cache line that utilize a lock prediction data structure to predict whether cache lines are associated with lock behavior or atomic update behavior so that a determination can be made as to whether or not to migrate ownership of that cache line to another cache.

In some embodiments, a cache line is associated with lock behavior by determining whether that cache line is associated with a release operation, and storing such determination in a hardware-based lock prediction data structure capable of being accessed on subsequent requests for that cache line to determine whether to migrate ownership of the cache line (when the cache line is in a migratory state, or associated with atomic update behavior), or whether to retain ownership of the cache line (when the cache line is in a non-migratory state, or associated with lock behavior). The hardware based lock prediction data structure may include an indication of the last behavior the cache line was associated with (i.e., lock behavior or atomic update behavior) or an indication of the probability that the cache line is associated with either lock behavior or atomic update behavior. In this manner, embodiments of a shared memory computing system may be configured to more efficiently share cache lines without utilizing additional operation bits, without utilizing new synchronization primitives, without having applications re-compiled and/or libraries re-written.

In particular, one embodiment of the invention provides for a method to control ownership of a cache line in a shared memory computing system of the type that includes a plurality of nodes. The method includes, in a first node among the plurality of nodes, storing a plurality of cache lines for the first node in a cache, and, in response to storing a cache line from the plurality of cache lines, updating a hardware-based lock prediction structure with data associated with the cache line, wherein at least a portion of the hardware-based lock prediction data structure includes lock prediction data predictive of whether the cache line is associated with a release operation. In response to a first memory request issued from the first node and associated with the cache line, it is determined whether the first memory request includes a first synchronization operation that uses the release operation to control access to the cache line or a second synchronization operation that does not use the release operation to control access to the cache line, wherein the first synchronization operation includes at least one acquire operation and the release operation to update the cache line and wherein the second synchronization operation atomically updates the cache line. The hardware-based lock prediction data structure is then updated with a respective indication of whether the first memory request includes the first synchronization operation such that the cache line is placed in a non-migratory state or whether the first memory request includes the second synchronization operation such that the cache line is placed in a migratory state. In particular, the non-migratory state prevents migrating ownership of the cache line from the first node to a second node among the plurality of nodes, while the migratory state allows migrating ownership of the cache line from the first node to the second node. The method then further includes, in response to a second memory request issued from the second node and also associated with the cache line, accessing the hardware-based lock prediction data structure to determine whether to migrate ownership of the cache line from the first node to the second node based on the hardware-based lock prediction data structure such that ownership of the cache line is migrated and the cache line is invalidated from the cache of the first node in response to the second memory request when the hardware-based lock prediction data structure predicts that the cache line is in the migratory state and ownership of the cache line is not migrated and a read-only copy of the cache line is sent to the second node in response to the second memory request when the hardware-based lock prediction data structure predicts that the cache line is in the non-migratory state.

In another embodiment, a method to control ownership of a cache line in a shared memory computing system of the type that includes a plurality of nodes is provided. The method includes, in a first node among the plurality of nodes, updating lock prediction data for a cache line associated with the first memory request within a hardware-based lock prediction data structure resident in the first node in response to a first memory request, wherein at least a portion of the lock prediction data is predictive of whether the cache line associated with the first memory request is further associated with a release operation. Then, in response to a second memory request that is associated with the cache line and issued by a second node among the plurality of nodes, the lock prediction data in the lock prediction data structure is accessed and it is determined whether to transfer ownership of the cache line from the first node to the second node based at least in part on the accessed lock prediction data.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 3 is a table illustrating synchronization primitives of several synchronization operations, including the acquire operation, release operation, and atomic update operation of PowerPC, MIPS, and related instruction sets, as well as synchronization primitives of the acquire operation, release operation, and atomic update operation of x86, IA-64, SPARC, and related instruction sets that may be used in the computer of FIG. 1 and/or the system of FIG. 2;

FIG. 4 is a schematic illustration showing several components of one embodiment of a circuit arrangement that may be included in a processing unit of a processing node of the system of FIG. 2;

FIG. 5 is a diagrammatic illustration of one embodiment of lock prediction data that may be stored by a hardware-based lock prediction data structure disposed in the circuit arrangement of FIG. 4;

FIG. 6 illustrates a state transition diagram for a cache line that includes four states and illustrates one migration of states as that cache line is subject to synchronization operations by the system of FIG. 2;

FIG. 7 illustrates a simplified state transition diagram for a cache line that includes two states and illustrates one migration of states as that cache line is subject to synchronization operations by the system of FIG. 2;

Figure 1:
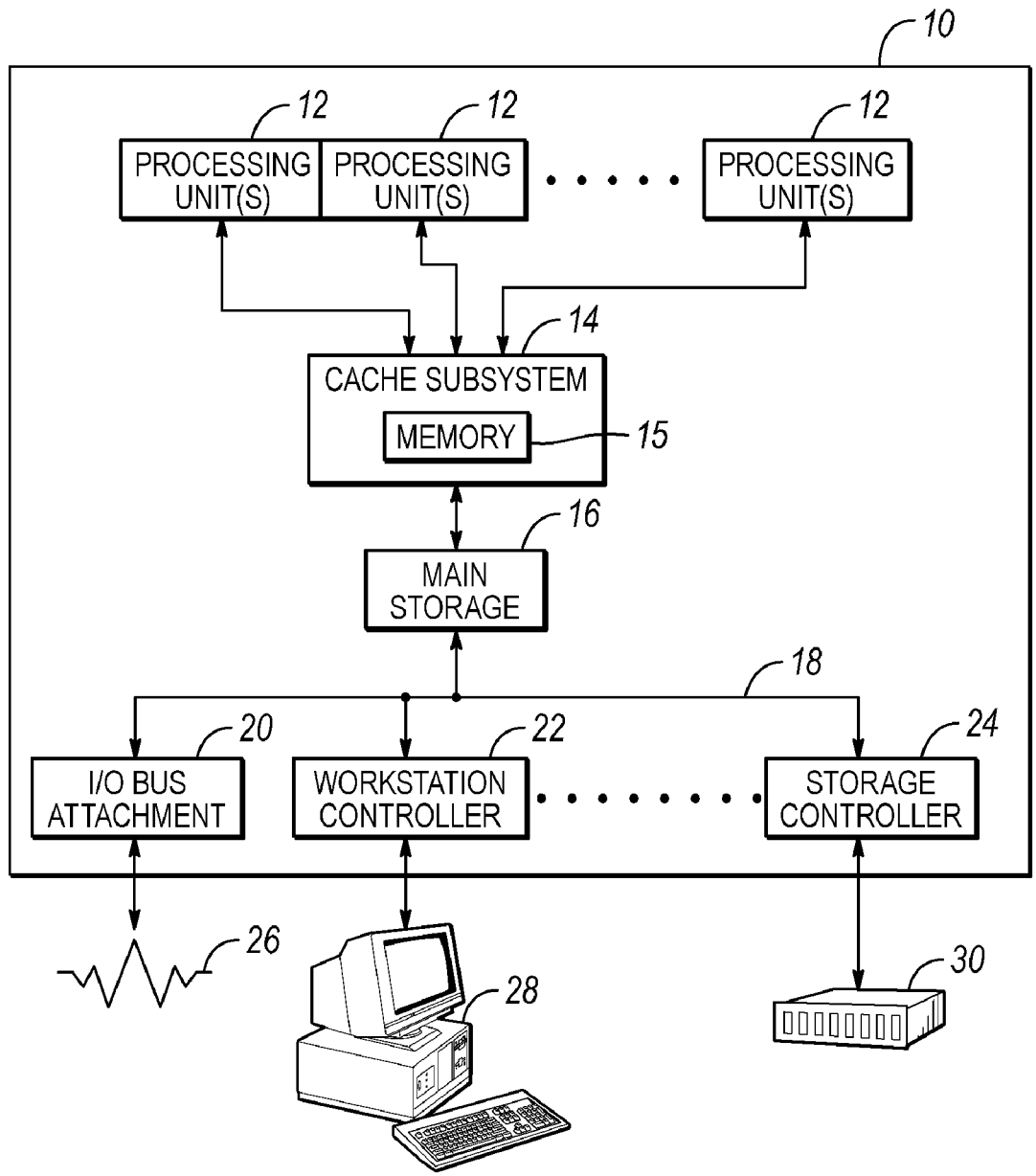
FIG. 1 is a block diagram of a shared memory computing system incorporating a lock prediction table for predictive ownership control of a cache line consistent with embodiments of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Embodiments of the invention include a method, circuit arrangement, and design structure to control ownership of a cache line in a shared memory computing system of the type that includes a plurality of nodes. Embodiments of the invention provide for a hardware-based lock prediction data structure, which may be a lock prediction table, which includes lock prediction data associated with a cache line to indicate whether that cache line is associated with lock behavior or atomic update behavior. The lock prediction data may be updated in response to a memory request for the cache line and indicate whether the memory request includes lock behavior or atomic update behavior, thus also being predictive of whether future memory requests include lock behavior or atomic update behavior. Thus, determining whether a cache line is associated with lock behavior or atomic update behavior may be accomplished in various embodiments of the invention without adding additional data (e.g., such as bits or labels) to synchronization primitives of the lock behavior and atomic update behavior, without changing the synchronization primitives of the lock behavior and atomic update behavior, without adding states to a coherence protocol, and the determination may be made on several instruction set architectures without changing those instruction set architectures.

Predictive ownership control of a cache line consistent with embodiments of the invention utilizes a lock prediction table to predict whether a cache line is associated with lock behavior or atomic update behavior, and thus whether the cache line should be loaded in a non-migratory or migratory state, respectively, based on previous synchronization operations on that cache line. When the cache line is in a migratory state, the ownership of the cache line may be migrated from a first node of a shared-memory computing system to a second node of the shared-memory computing system and the cache line may be invalidated in the first node. However, when the cache line is in a non-migratory state, the cache line may not be migrated from the first node to the second node and a read-only copy of the cache line may be sent to the second node. The migration of the cache line, or the transfer of a read-only copy of the cache line, may be in response to a memory request or synchronization operation from the second node.

In some embodiments, a method to control ownership of a cache line in a shared memory computing system of the type that includes a plurality of nodes includes, in a first node among the plurality of nodes, storing a plurality of cache lines for the first node in a cache, and, in response to storing a cache line from the plurality of cache lines, updating a hardware-based lock prediction structure with data associated with the cache line, wherein at least a portion of the hardware-based lock prediction data structure includes lock prediction data predictive of whether the cache line is associated with a release operation. In response to a first memory request issued from the first node and associated with the cache line, it is determined whether the first memory request includes a first synchronization operation that uses the release operation to control access to the cache line or a second synchronization operation that does not use the release operation to control access to the cache line, wherein the first synchronization operation includes at least one acquire operation and the release operation to update the cache line and wherein the second synchronization operation atomically updates the cache line. The hardware-based lock prediction data structure is then updated with a respective indication of whether the first memory request includes the first synchronization operation such that the cache line is placed in a non-migratory state or whether the first memory request includes the second synchronization operation such that the cache line is placed in a migratory state. In particular, the non-migratory state prevents migrating ownership of the cache line from the first node to a second node among the plurality of nodes, while the migratory state allows migrating ownership of the cache line from the first node to the second node. The method then further includes, in response to a second memory request issued from the second node and also associated with the cache line, accessing the hardware-based lock prediction data structure to determine whether to migrate ownership of the cache line from the first node to the second node based on the hardware-based lock prediction data structure such that ownership of the cache line is migrated and the cache line is invalidated from the cache of the first node in response to the second memory request when the hardware-based lock prediction data structure predicts that the cache line is in the migratory state and ownership of the cache line is not migrated and a read-only copy of the cache line is sent to the second node in response to the second memory request when the hardware-based lock prediction data structure predicts that the cache line is in the non-migratory state.

In another embodiment, a method to control ownership of a cache line in a shared memory computing system of the type that includes a plurality of nodes is provided. The method includes, in a first node among the plurality of nodes, updating lock prediction data for a cache line associated with the first memory request within a hardware-based lock prediction data structure resident in the first node in response to a first memory request, wherein at least a portion of the lock prediction data is predictive of whether the cache line associated with the first memory request is further associated with a release operation. Then, in response to a second memory request that is associated with the cache line and issued by a second node among the plurality of nodes, the lock prediction data in the lock prediction data structure is accessed and it is determined whether to transfer ownership of the cache line from the first node to the second node based at least in part on the accessed lock prediction data.

In that embodiment, and in response to determining that a release operation for the cache line associated with the first memory request followed the first memory request, the lock prediction data is updated to indicate the release operation. The indication of the release operation may be predictive that the cache line is associated with the release operation. The accessed lock prediction data may predict that the cache line associated with the first and second memory requests is associated with the release operation. Thus, the method may include preserving ownership of the cache line with the first node, as well as copying the cache line and transferring a read-only copy of the cache line to the second node. Additionally, the accessed lock prediction data may include data associated with a plurality of release operations of a plurality of memory requests associated with the cache line, wherein the accessed lock prediction data predicts that the cache line associated with the first and second memory requests is further associated with the release operation. On the other hand, the lock prediction data may predict that the cache line associated with the first and second memory requests is not associated with the release operation. Thus, the method may include migrating the cache line and ownership of the cache line from the first node to the second node and invalidating the cache line from the cache of the first node.

The first memory request may include at least one acquire operation and at least one release operation. Additionally, the first memory request may include at least one release operation such that lock prediction data predicts that the cache line associated with the first memory request is further associated with the release operation. The lock prediction data structure may be a tagged set-associative array. As such, the lock prediction data for the cache line associated with the first memory request may include validity data associated with the cache line, address data for the cache line, state data for the cache line, and replacement policy data for the cache line. In that embodiment, the state data may indicate a state selected from the group consisting of an invalid state, an atomically updated state, a potentially atomically updated state, a locked state, and a potentially-locked state. Alternatively, the lock prediction data structure may be a tagless address-hash-indexed array. As such, the lock prediction data for the cache line associated with the first memory request may include state data for the cache line. In that embodiment, the state data may include a state selected from the group consisting of an invalid state, an atomically updated state, a potentially atomically updated state, a locked state, and a potential-lock state.

Hardware and Software Environment

Turning more particularly to the drawings, wherein like numbers denote like parts throughout the several views, FIG. 1 is a block diagram of a shared memory computing system 10 consistent with embodiments of the invention. Shared memory computing system 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Shared memory computing system 10 may be referred to as "computing system," but will be referred to as "computer" for the sake of brevity. One suitable implementation of computer 10 may be a multi-user computer, such as a computer available from International Business Machines Corporation ("IBM") of Armonk, N.Y.

Computer 10 generally includes one or more processing units 12 coupled to a memory subsystem that may further include a cache subsystem 14, memory 15, and main storage 16. The cache subsystem 14 may be comprised of dynamic random access memory ("DRAM"), static random access memory ("SRAM"), flash memory, and/or another digital or solid state storage medium that typically comprises one or more levels of data, instruction and/or combination caches, with certain caches serving the processing units 12 in a shared manner as is well known in the art. In specific embodiments, the cache subsystem 14 includes the shared memory 15 (e.g., such as, for example, a level-three ["L3"] cache and/or a level-four ["L4"] cache) and/or other digital storage memory that may be shared between the processing units 12 of the node as is well known in the art. The main storage 16 may comprise a hard disk drive and/or another digital storage medium. Moreover, as will be discussed below, each processing unit 12 may include at least one processing core and at least one level of dedicated cache memory.

Main storage 16 may be coupled to a number of external devices (e.g., I/O devices) via a system bus 18 and a plurality of interface devices, e.g., an input/output bus attachment interface 20, a workstation controller 22, and/or a storage controller 24, which respectively provide external access to one or more external networks 26, one or more workstations 28, and/or one or more storage devices such as a direct access storage device ("DASD") 30. System bus 18 may also be coupled to a user input (not shown) operable by a user of computer 10 to enter data (e.g., the user input may include a mouse, a keyboard, etc.) and a display (not shown) operable to display data from the computer 10 (e.g., the display may be a CRT monitor, an LCD display panel, etc.). Computer 10 may also be configured as a member of a distributed computing environment and communicate with other members of that distributed computing environment through network 26.

The computer 10 includes at least one memory requester to request a cache line that is serviced by a common cache memory (e.g., the cache subsystem 14 and/or cache memory of at least one processing unit 12) as is well known in the art. For example, the computer 10 of FIG. 1 may include one or more processing unit 12 serviced by a common cache memory, while each processing unit 12 may include one or more memory requesters serviced by a common cache memory (e.g., the cache subsystem 14, main storage 16, and/or memory internal to the processing unit 12). In specific embodiments, the requesters in computer 10 may include at least one processing unit 12, a component of a processing unit 12 (e.g., a level-one cache, a level-two cache, an I/O controller, or other component of a processing unit 12 as described below), and/or a core of a processing unit 12 (as well as a hardware thread of a core).

Figure 2:
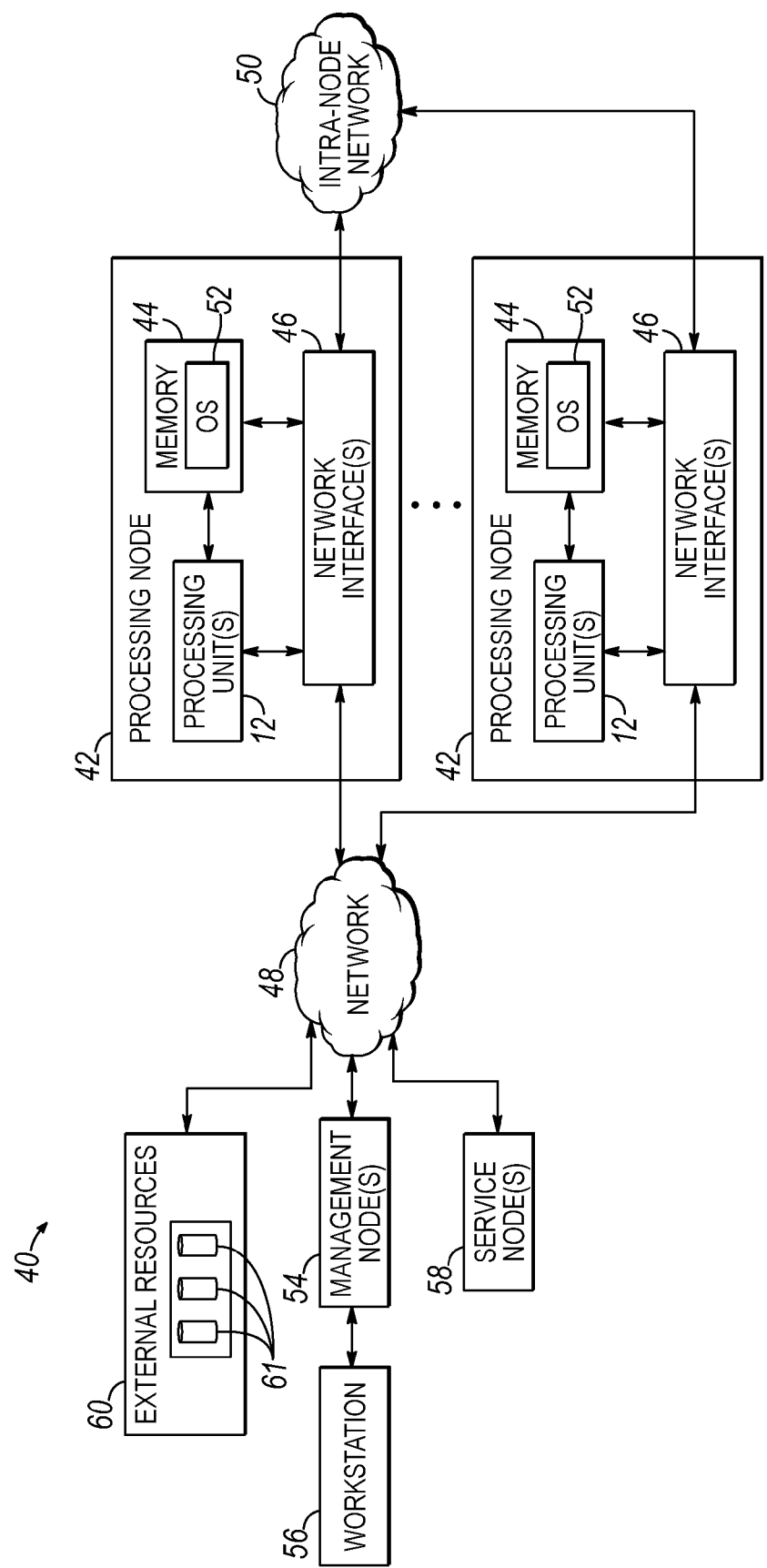
FIG. 2 is a block diagram of a shared memory computing system incorporating a lock prediction table for predictive ownership control of a cache line consistent with alternative embodiments of the invention.

Computer 10 is merely representative of one suitable environment for use with embodiments of the invention, and embodiments of the invention may be utilized in various other alternative environments. For example, FIG. 2 is a block diagram of an alternative shared memory computing system 40 consistent with embodiments of the invention. The alternative shared memory computing system 40, hereinafter "system" 40, may include a plurality of processing nodes 42 that each include at least one processing unit 12, a memory 44, and a network interface 46. The network interface 46, in turn, may communicate with at least one network 48, 50, and in particular the network interface 46 may be configured to communicate with at least one inter-node network 50 dedicated to communication between the processing nodes 42. Each processing node 42 may be configured with an operating system 52 and application (not shown). In typical embodiments, each of the processing nodes 42 is configured to receive and process at least one task with the application, and thus the processing nodes 42, collectively, are configured to perform the bulk of the work of the system 40. In some embodiments, however, some processing nodes 42 may be configured as dedicated I/O nodes and thus maintain an interface between a subset, or "group," of processing nodes 42 and the network(s) 48, 50. Moreover, I/O nodes may be operable to perform process authentication and authorization, task accounting, debugging, troubleshooting, booting, and configuration operations as is well known in the art. Thus, the total work for a group of processing nodes 42 may be simplified and additional burdens on each of the group of processing nodes 42 that would be presented by interfacing with the entirety of the processing nodes 42 and the rest of the system 40 are avoided. Each processing node 42 may include more than one processing unit 12, and, in specific embodiments, each node may include two or four processing units 12 as is well known in the art.

The system 40 may include one or more management nodes 54 that may store compilers, linkers, loaders, and other programs to interact with the system 40. The management nodes 54 may be accessed by a user at a workstation 56 controlled by at least one management node 54. Thus, the user may submit one or more programs for compiling, tasks for execution, execution contexts, workloads, parts of a workload, or jobs to one or more service nodes 58 of the system 40. The management nodes 54 may each include at least one processing unit and a memory in a similar manner to that of the processing nodes 42 to perform auxiliary functions which, for reasons of efficiency or otherwise, may be best performed outside the processing nodes 42 or service nodes 58. For example, interactive data input, software code editing, software code compiling, and/or other user interface functions may be handled by the management nodes 54.

The service nodes 58 may include databases and administrative tools for the system 40. The databases may maintain state information for the processing nodes 42, including the current scheduling of tasks across the processing nodes 42, while the administrative tools may control the scheduling and loading of programs, tasks, data, and jobs onto the processing nodes 42, including loading programs, tasks, data, and jobs onto each processing unit 12 of each processing node 42. As such, the service nodes 58 may, in some embodiments, gather a group of processing nodes 42 from the plurality of processing nodes 42 and dispatch at least one task, job, application, part of a workload, execution context, or program to the group of compute nodes 12 for execution. Hereinafter, the at least one task, job, workload, part of a workload, execution context, or program will be referred to as a "task" for the sake of brevity. A task may be communicated across the network 48 and/or 50 and through the I/O nodes to a processing node 42 to be processed. The functionality of the management nodes 54 and/or service nodes 58 may be combined in a control subsystem operable to receive, manage, schedule, redistribute, and otherwise control jobs for the processing nodes 42.

Management nodes 54 and/or service nodes 58 may each include a group of processing nodes 42 and at least one I/O node. In this way, management nodes 54 and/or service nodes 58 may be internally connected to the processing nodes 42 through the inter-node network 50 as well as network 48. Alternately, management nodes 54 and/or service nodes 58 may each include of a group of processing nodes 42 and at least one I/O node separate from the processing nodes 42 (i.e., the management nodes 54 and/or service nodes 58 may be configured as "stand-alone" nodes). Furthermore, management nodes 54 and/or service nodes 58 may each include one processing node 42. One or more external resource servers 60 may be servers accessible over the network 48 and configured to provide interfaces to various data storage devices, such as, for example, hard disk drives 61, optical drives (e.g., CD ROM drives, CD R/RW drives, DVD+/−R/RW drives, Blu-Ray drives, holographic storage drives, etc.), solid state memory drives, or other I/O devices, resources, or components that may be accessed for data and/or to process a task.

In a similar manner as the computer 10, the memory 44 of each processing node 42 may include a cache subsystem comprised of DRAM, SRAM, flash memory, and/or another digital or solid state storage medium. Additionally, the memory 44 of each processing node 42 may further comprise a main storage that comprises a hard disk drive and/or another digital storage medium. Also similarly, the cache subsystem may comprise one or more levels of data, instruction and/or combination caches, with certain caches serving the processing units 12 in a shared manner as is well known in the art.

A node, whether configured as a processing node 42, I/O node, management node 54, or service node 58, is a portion of the system 40 that includes one or more requesters for cache lines and is serviced by a common cache memory (e.g., the memory 44 or a cache memory internal to at least one processing unit 12 of the node 42) as is well known in the art. In specific embodiments, the requesters in the system 40 may include a processing node 42 (hereinafter, "node" 42), a memory 44 of a node, at least one processing unit 12, a component of a processing unit 12 (e.g., a cache and/or I/O controller as disclosed below), and/or a core of a processing unit 12 (as well as a hardware thread of a core). In specific embodiments each node 42 may be configured to process a workload and/or one or more tasks and cooperate with the other nodes 42 through the respective network interfaces 46 to process a workload and/or the one or more tasks in a parallel fashion as is well known in the art. Although one network interface 46 is shown in FIG. 2, each node 42 may include a plurality of network interfaces 46 or other network connections. As such, each node 42 may be configured to communicate to the system 40 or other nodes 42 through various networks, including the intra-node network 50. For example, each node 42 may communicate to every other node 42 through a torus network. Moreover, various nodes 42 may be custom configured to perform various functions. For example, some nodes 42 of the system 40 may be configured as computing nodes (e.g., to receive a workload and/or at least one task and process that workload and/or at least one task), I/O nodes (e.g., to manage the communications to and/or from each computing node and the rest of the system 40), management nodes (e.g., to manage the system 40 and receive a workload and/or at least one task), and/or service nodes (e.g., to monitor the system 40, schedule a workload, and/or support the nodes 42). As such, and in some embodiments, the system 40 may have an architecture consistent with a Power System shared computing system as distributed by IBM. In alternative embodiments, the system 40 may have an architecture consistent with a BlueGene parallel computing system architecture as developed by IBM. In alternative embodiments, the system 40 may have an architecture consistent with a RoadRunner parallel computing system architecture as also developed by IBM. Moreover, and in other alternative embodiments, the system 40 may have an architecture consistent with a non-uniform memory access ("NUMA") and/or a cache coherent NUMA ("ccNUMA") computing system as is well known in the art. Nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

As illustrated through FIG. 1 and FIG. 2, computer 10 and each node 42 may include one or more processing units 12. During operation, various instructions and/or data organized into cache lines may be used to process a task. In some embodiments, the cache lines are portions of data of a memory region of the computer 10 and/or system 40. In shared memory computing systems (e.g., computer 10 and/or system 40), shared data in the cache lines, and thus, by extension, the cache lines themselves, may be read, modified, and/or released by synchronization operations, including synchronization operations that lock data in the cache lines to update such data, as well as synchronization operations that atomically update data in the cache lines (for the sake of brevity, and unless otherwise specified, it will be understood that a reference to a "cache line" throughout the subject disclosure may refer to all or simply a subset of the data of the cache line). The synchronization operations may include various synchronization primitives, which may in turn include an acquire operation, a release operation, and/or an atomic update operation. In some embodiments, the acquire operation includes at least a "load and reserve" ("LARX") and a "store conditional" ("STCX") synchronization primitive as is well known in the art to atomically acquire and update a cache line. In alternative embodiments, the acquire operation includes at least a "load" ("LOAD") and a "compare-and-exchange" ("COMP&EXCH") synchronization primitive as is also well known in the art to lock, acquire, and update data in a cache line. In some embodiments, the release operation includes at least a "store" ("STORE") and/or the STCX synchronization primitive to release a lock on a cache line as is known in the art. In alternative embodiments, the release operation includes the STORE, STCX, EXCH, and/or COMP&EXCH synchronization primitives as is known in the art. In some embodiments, the atomic update operation includes the same instructions as those in the embodiments of the acquire operation, but no lock is associated with the atomic update operation. In some embodiments, the LARX and LOAD synchronization primitives of acquire and atomic update operations may be referred to as "load operations," as those synchronization primitives are configured to load and/or copy a cache line from its memory region. On the other hand, the STCX, EXCH, and COMP&EXCH synchronization primitives of acquire and atomic update operations may be referred to as "write operations," as those synchronization primitives are configured to write, overwrite, or change at least a portion of a cache line.

In specific embodiments, a cache line is locked by setting a lock variable of the cache line to set value. When a critical section associated with that cache line is complete, the lock variable of that cache line is reverted to its original state (e.g., a clear value) and other requesters may contend to acquire a lock on that cache line. Thus, and in specific embodiments, an acquire operation and a release operation are paired to at least respectively lock and unlock a cache line during a critical section of execution. However, and in alternative embodiments, the cache line may be subject to a relatively quick update or change, such as that associated with incrementing a counter or adding an entry to a queue. As such, the critical section may be relatively short and the atomic update operation may be used to modify the cache line without locking and unlocking the cache line.

FIG. 3 is a table 70 illustrating synchronization primitives of several synchronization operations, including the acquire operation, release operation, and atomic update operation of PowerPC, MIPS, and related instruction sets, as well as synchronization primitives of the acquire operation, release operation, and atomic update operation of x86, IA-64, SPARC, and related instruction sets that may be used by the computer 10 of FIG. 1 and/or the system 40 of FIG. 2. As illustrated in FIG. 3, the synchronization primitives for acquire operations in each instruction set may be the same as their respective synchronization primitives for atomic update operations in that instruction set. Thus, conventional shared memory computing systems often encounter difficulties determining whether synchronization operations on a cache line include an acquire operation or an atomic update operation, which in turn dictates whether a cache line is in a migratory or a non-migratory state. For example, the lock behavior of a PowerPC architecture utilizes the same synchronization primitives as the atomic update behavior with an additional STCX or STORE synchronization primitive for a release operation. To differentiate between lock behavior and atomic update behavior in a shared memory computing system, embodiments of the invention provide for a hardware based lock prediction data structure configured with lock prediction data to predict whether a cache line is associated with the lock behavior (and is thus non-migratory) or whether the cache line is associated with the atomic update behavior (and is thus migratory).

Embodiments of the invention provide for controlling ownership of shared memory computing system data by predicting whether a cache line is in a migratory state based on lock prediction data in a hardware-based lock prediction data structure. Controlling ownership of the shared memory computing system data based on lock prediction data consistent with embodiments of the invention may be implemented in a circuit arrangement on a processing unit 12 or other integrated circuit device. However, a wide variety of programmable devices may utilize ownership control based on lock prediction data consistent with embodiments of the invention. Moreover, as is well known in the art, integrated circuit devices are typically designed and fabricated using one or more computer data files, referred to herein as design structures, that define the layout of the circuit arrangements on the devices. These design structures are typically generated by a design tool and are subsequently used during manufacturing to create the layout masks that define the circuit arrangements applied to a semiconductor wafer. Typically, the design structures are provided in a predefined format using a hardware definition language ("HDL") such as VHDL, verilog, EDIF, etc. While the invention has and hereinafter will be described in the context of circuit arrangements implemented in fully functioning integrated circuit devices and shared memory computing systems utilizing such devices and/or circuit arrangements, those skilled in the art will appreciate that circuit arrangements consistent with the invention are capable of being distributed as design structures in a variety of forms, and that the invention applies equally regardless of the particular type of signal bearing media used to actually carry out the distribution. Examples of signal bearing media include, but are not limited to, recordable type media such as volatile and non-volatile memory devices, floppy disks, hard disk drives, CD-ROM's, and DVD's, among others, as well as transmission type media such as digital and analog communications links.

Figure 9:
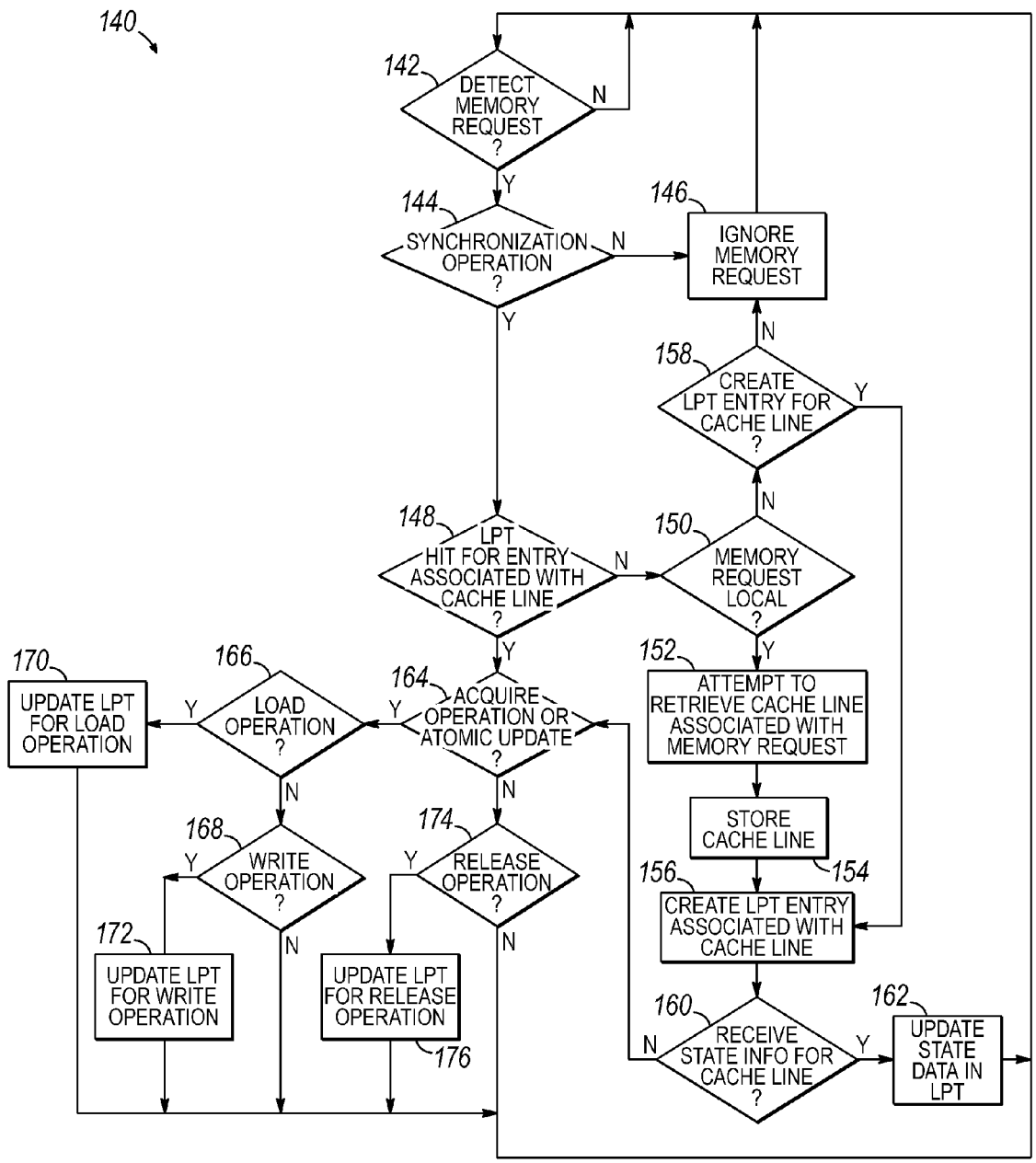
FIG. 9 is a flowchart illustrating one embodiment of a logic flow that may occur in a hardware-based lock prediction data structure disposed in a node of the system of FIG. 2 to update that lock prediction data structure with information predictive of the synchronization operations associated with a cache line.
Figure 10:
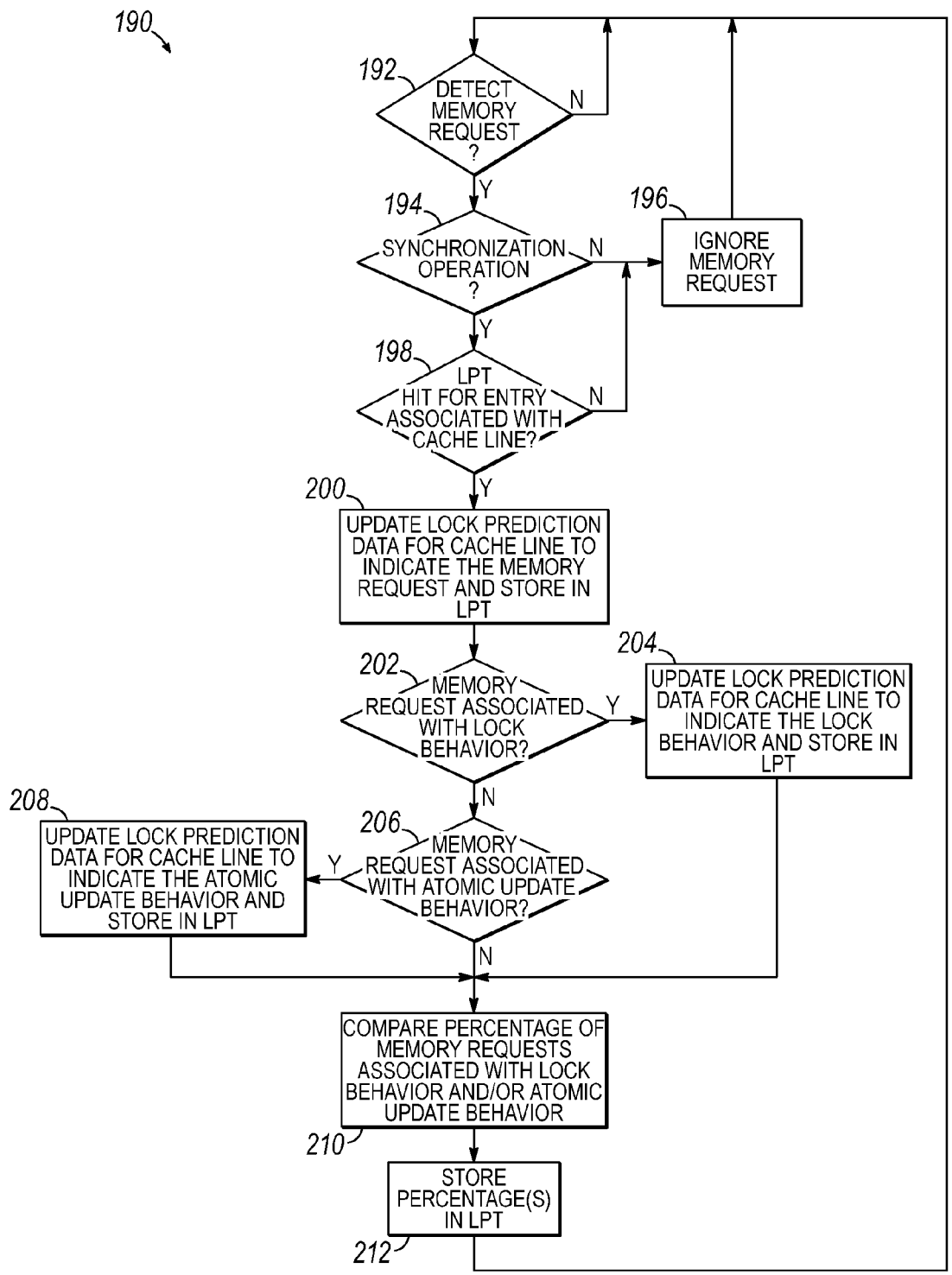
FIG. 10 is a flowchart illustrating an alternative embodiment of a logic flow that may occur in a hardware-based lock prediction data structure disposed in a node of the system of FIG. 2 to update that lock prediction data structure with information predictive of the synchronization operations associated with a cache line.
Figure 11:
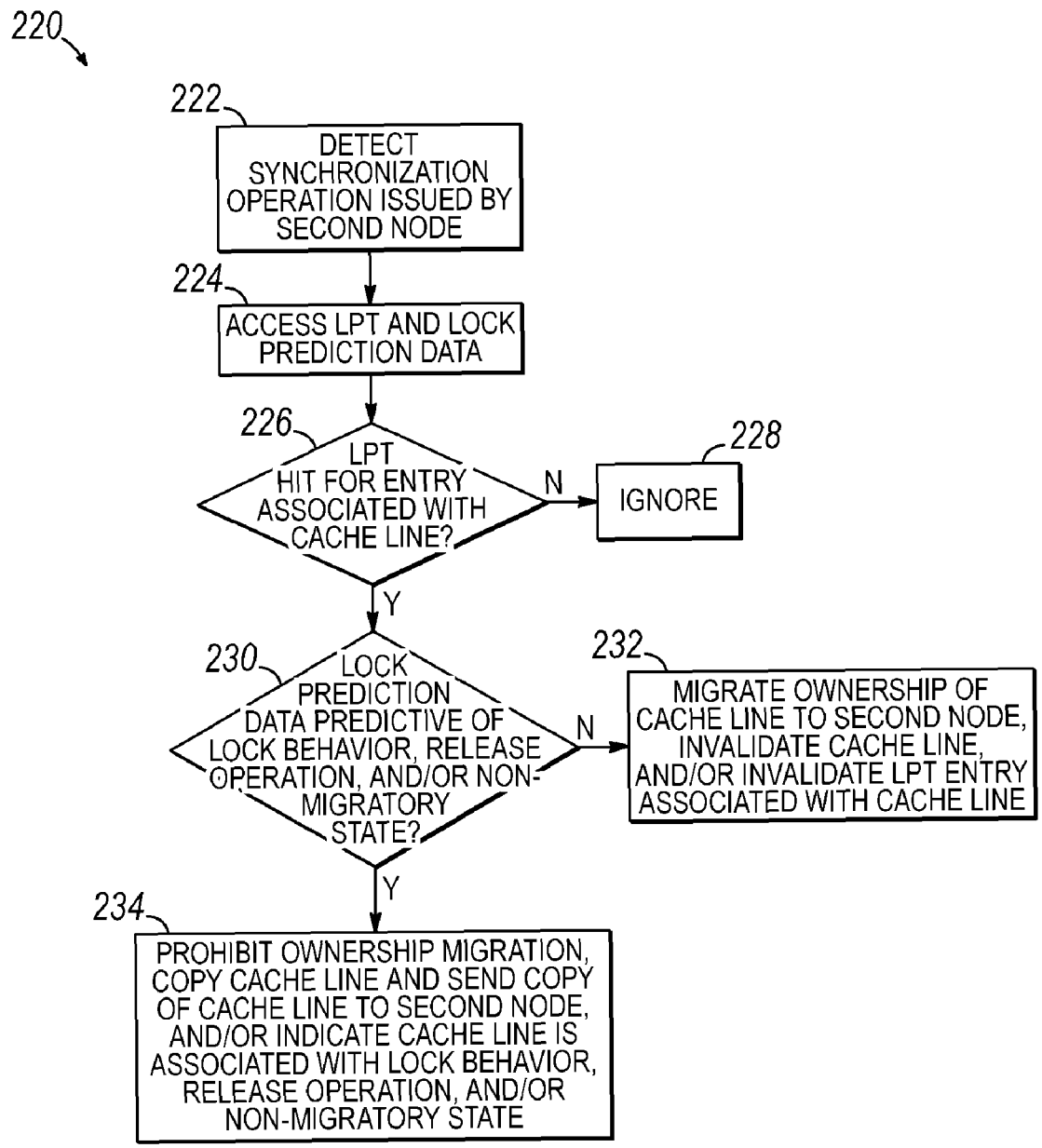
FIG. 11 is a flowchart illustrating one embodiment of a logic flow that occurs in a first node of the system of FIG. 2 to allow or prohibit the migration of ownership of a cache line from the first node to a second node.

FIG. 4 is a schematic illustration of several components of a circuit arrangement that may be included in a processing unit 12 of a processing node 42 of FIG. 2 consistent with embodiments of the invention. While FIGS. 4-11 include a schematic diagram, a lock prediction data diagrammatic illustration, state transition diagrams, and logic flowcharts that reference the shared memory computing system 40 of FIG. 2, it will be appreciated that the circuit arrangement 80 illustrated in FIG. 4, the lock prediction data diagrammatic illustration of FIG. 5, the state transition diagrams of FIGS. 6-8, and the flowcharts of FIGS. 9-11 are equally applicable to the processing unit 12 of computer 10 of FIG. 2 without departing from the scope of the invention. As such, references to a "node" and/or "nodes" in the following disclosure are not intended to be limiting, and may be equally applicable to a "processing unit" or "processing units," as well as "microprocessor" or "microprocessors," respectively, without departing from the scope of the invention.

FIG. 4 is a schematic illustration of several components of one embodiment of a circuit arrangement 80 that may be included in a processing unit 12 of a processing node 42 consistent with embodiments of the invention. The processing unit 12 may include at least one processing core 82 (illustrated as, and hereinafter, "core" 82) that further includes a level-one ("L1") cache 84 and is in communication with at least one additional cache, which may be a level-two ("L2") cache 86 as is well known in the art. In some embodiments, the core 82 is configured to process several different threads of execution at once, and thus may be a multi-threaded core 82 as is known in the art. In some embodiments, the L1 cache 84 and/or L2 cache 86 (the "caches 84, 86") are configured to receive a plurality of cache lines (e.g., instructions and/or data) from at least one memory region (e.g., at least a portion of the memory in a cache subsystem, main storage, memory 44 on that or other nodes 42, and/or across the network 48 in the management nodes 54, workstation 56, service nodes 58, and/or external resource server 60) for the core 82 to execute a task. A memory region may be an aligned region of memory of the system 40 that ranges in size from about two cache lines to a physical page size specified by the system 40. Specifically, each memory region may be a power-of-two multiple of the number of cache lines in that memory region multiplied by the size of each cache line. For example, if a memory region has four lines (e.g., $2^2$ cache lines) with about 128 bytes per cache line, the memory region may be about 512 bytes long. Thus, the caches 84, 86 may be configured to store a plurality of cache lines from at least one memory region to process a task. The processing unit 12 may further include an input/output controller 88 (illustrated as, and hereinafter, "I/O" controller 88) to communicate with the network interface(s) 46 and/or memory 44 of that processing node 42. As illustrated in FIG. 4, the L2 cache 86 is configured between the core 82 and the I/O controller 88. The core 82 may alternatively be in direct communication with the I/O controller 88 without departing from the scope of the invention. In some embodiments, the I/O controller 88 includes a fabric interface (not shown) that in turn communicates with a bus controller (not shown) and a memory controller (not shown) as is well known in the art. In this manner, the I/O controller 88 may be configured to communicate with the nodes 42 of the system 40 through the fabric interface of the I/O controller 88, with I/O devices (not shown) through the bus controller, and with the memory 44 through the memory controller.

During operation, a plurality of cache lines from at least one memory region are cached across the L1 cache 84 and/or the L2 cache 86. The processing unit 12 may be configured to update lock prediction data for a cache line in response to a memory request associated with that cache line and that includes a synchronization operation. As illustrated in FIG. 4, the L2 cache 86 includes a hardware-based lock prediction data structure 90 (hereinafter "lock prediction table" 90 or "LPT" 90) that includes lock prediction data, at least a portion of which is predictive of whether a cached cache line is associated with a release operation. In turn, the lock prediction data is predictive of whether the cached cache line is associated with lock behavior. In this manner, the lock prediction data in the LPT 90 may be accessed in response to a memory request from a second node 42 to determine whether to transfer ownership of the cache line from the node in which it is cached to the second node 42 based at least in part on the lock prediction data in the LPT 90. In some embodiments, the L2 cache 86 may include a hash index 92 associated with the LPT 90 and configured to provide an index between at least one cache line of the system 40 and its associated LPT 90 entry. In some embodiments, each processing unit 12 may be a POWER system microarchitecture microprocessor as distributed by IBM. Although not intended to be limiting, each processing unit 12 may be a POWER4, POWER5, POWER6, and/or POWER7 system microarchitecture microprocessor.

FIG. 5 is a diagrammatic illustration of one embodiment of lock prediction data that may be stored in the LPT 90 consistent with embodiments of the invention. In some embodiments, the lock prediction data includes information about at least one cached cache line of a processing unit 12. In specific embodiments, the LPT 90 may be configured as a tagged set-associative array for increased accuracy, or a tagless address-hash-indexed array for increased space-efficiency. As illustrated in FIG. 5, the LPT 90 is configured as a tagged, set-associative array that includes, for each entry, at least one valid bit to indicate the validity of at least one cached cache line, an address tag to indicate the memory region and other locational information of the at least one cached cache line, at least one state bit to indicate the state of the at least one cached cache line (e.g., states may include the following: Invalid, Atomically Updated, Potentially Atomically Updated, Locked, and/or Potentially Locked and Unreleased), at least one replacement policy bit to implement a replacement policy for the at least one cached cache line (e.g., such as a least-recently-used or a least-frequently-used policy to track the most contested and/or updated cache lines, and/or another replacement policy in the art), and/or other synchronization operation data of the at least one cached cache line. In some embodiments, the at least one state bit indicates the current state of a cache line, while the synchronization operation data includes at least a numerical indication (e.g., such as, for example, a count) of the number of memory requests, instances of lock behavior, and/or instances of atomic update behavior associated with each cache line. Thus, and in specific embodiments, the synchronization operation data may indicate the percentage of times a cache line has been locked and/or atomically updated by memory requests or synchronization operations. In this manner, the lock prediction data may be configured to be predictive of whether that cache line is associated with a release operation and thus lock behavior, or whether that cache line is not associated with a release operation and thus that cache line is associated with atomic update behavior.

In alternative embodiments, the LPT 90 may be configured as a tagless, address-hash-indexed array with at least one bit of state (e.g., the portion labeled "STATE BIT(S)" in the table 90 of FIG. 5) for each entry, but without the at least one valid bit, the address tag, the at least one replacement policy bit, and the release operation data for each entry. Thus, an entry for a cache line of the system 40 in the LPT 90 may be accessed through the hash index 92 as is known in the art. In some of the alternative embodiments, the hash index 92 may be incorporated with the LPT 90. In further alternative embodiments, the LPT 90 may include two or more of any of the at least one bit of state, the at least one valid bit, the address tag, the at least one replacement policy bit, and/or the release operation data for each entry. Throughout the embodiments of the LPT 90, at least one parity bit (not shown) may be included for each entry.

Throughout the embodiments, the LPT 90 may be updated in response to memory requests from the processing unit 12 of the node 42 upon which it is configured. In some embodiments, the LPT 90 is updated in response to memory requests from the processing unit 12 of the node 42 upon which it is configured as well as other memory requests from other nodes 42 (e.g., including a second node 42) of the system 40.

As disclosed above, the LPT 90 may be configured to indicate the state of at least one cache line of the system 40, and in specific embodiments an entry may indicate that a cache line is in the Invalid (I), Atomically Updated (U), Potentially Atomically Updated (US), Locked (L), or Potentially Locked and Unreleased (Ls) state. As also disclosed above, the LPT 90 may be configured to alter the at least one state bit, and thus the state, of a cache line in response to memory requests. FIG. 6 illustrates a state transition diagram 110 for a cache line consistent with embodiments of the invention that includes four states (the I, U, L, and Ls states) and illustrates possible migrations of states as that cache line is subject to synchronization operations. In some embodiments, in response to a memory request associated with a cache line that includes the acquire operation or the atomic update operation (e.g., the memory request includes a STCX, EXCH, and/or COMP&EXCH synchronization primitive), the LPT 90 determines if there is an entry for the cache line associated with that memory request in response to that memory request. When there is no entry associated with the cache line in the LPT 90, the LPT 90 allocates an entry for that cache line in the LPT 90 and updates the state of the cache line to U. When there is an entry associated with that cache line and the cache line is in the U state, the LPT 90 determines that the cache line is associated with atomic update behavior and does not change the state of that cache line. In alternative embodiments, in response to the memory request associated with a cache line that includes the acquire operation or the atomic update operation, the LPT 90 determines if there is an entry for the cache line associated with that memory request, and when there is no entry associated with that cache line in the LPT 90 the LPT 90 allocates an entry for that cache line in the LPT 90 and updates the state of the cache line to Ls. When there is an entry associated with that cache line and the cache line is in the Ls state, the LPT 90 determines that the cache line is associated with lock behavior and does not change the state of the cache line.

In the U state, a cache line may be in a migratory state and ownership of the cache line may be migrated from a first node 42 (e.g., the node 42 in which that cache line is cached) to a second node 42. In the event of a memory request for the cache line from the second node 42 while that cache line is in the U state, ownership of the cache line may be migrated from the first node 42 to the second node 42 and the cache line may be invalidated from the first node 42.

In response to a memory request associated with a cache line that includes the release operation (e.g., the memory request includes the STORE synchronization primitive) while that cache line is in the U state, the LPT 90 determines that the cache line is associated with lock behavior and updates the state of the cache line to L. In the L state, a cache line is in a locked state, which may be a non-migratory state. As such, ownership of the cache line may not be migrated from a first node 42 to a second node 42. In the event of a memory request for the cache line from the second node 42 when that cache line is in the L state, a copy of the cache line may be sent to the second node 42 with an indication that the cache line is in the L state.

In response to a memory request associated with a cache line that includes the acquire operation or the atomic update operation (e.g., the memory request includes a STCX, EXCH, and/or COMP&EXCH synchronization primitive) while that cache line is in the L state, the LPT determines that the cache line may be associated with lock behavior and updates the state of the cache line to Ls. In the Ls state, a cache line is in a potentially locked and unreleased state, which may be a non-migratory state. As such, ownership of the cache line may not be migrated from a first processing node 42 to a second processing node 42. In the event of a memory request for the cache line from the second processing node 42 when that cache line is in the Ls state, a copy of the cache line may be sent to the second processing node 42 with an indication that the cache line is in the Ls state.

In response to a memory request associated with a cache line that includes the release operation (e.g., the memory request includes a STORE synchronization primitive) while that cache line is in the Ls state and before another acquire operation or atomic update operation, the LPT 90 determines that the cache line is associated with lock behavior and updates the state of the cache line to L. However, in response to a memory request associated with a cache line that includes the acquire operation or atomic update operation (e.g., the memory request includes a STCX, EXCH, and/or COMP&EXCH synchronization primitive) while that cache line is in the Ls state, the LPT determines that the cache line is associated with atomic update behavior and updates the state of the cache line to U.

Thus, as shown in FIG. 6, the LPT 90 may determine the state of a cache line in response to memory requests (either from the node 42 in which that cache line is cached or from a second node 42 of the system 40) based on whether those memory requests include the acquire operation, release operation, and/or atomic update operation. In specific embodiments, the LPT 90 may determine the state of a cache line in response to memory requests and based on synchronization primitives, including the STCX, EXCH, and COMP&EXCH synchronization primitives of the acquire operation and/or atomic update operation, as well as the STORE synchronization primitive of the release operation. The state of a cache line may initially be in either the U or the Ls state based upon whether it is advantageous and/or desirable to place the initial state of a cache line in the U or Ls state. For example, and in some embodiments, it is desirable to place the cache line in the U state when the memory requests often include the acquire operation and/or atomic update operation, but do not often include the release operation. Also for example, and in alternative embodiments, it is desirable to place the cache line in the Ls state when the memory requests often include the release operation.

FIG. 7 illustrates a simplified state transition diagram 120 for a cache line consistent with embodiments of the invention that include two states (the I and U states) and illustrates one migration of states as that cache line is subject to synchronization operations, and in specific embodiments the simplified state transition diagram 120 illustrates the migration of states based on detection of a specific synchronization primitive. More specifically, the simplified state transition diagram 120 illustrates the migration of states based on the detection of release operations (e.g., memory requests that include the STORE synchronization primitive). For example, the LPT 90 may track only one type of synchronization operation, and in specific embodiments the LPT 90 may only track lock behavior and associated synchronization operations. Thus, the LPT 90 may not track atomic update behavior and one state bit may be used to indicate the state of a cache line.

In some embodiments, in response to a memory request associated with a cache line that includes the acquire operation or the atomic update operation (e.g., the memory request includes a STCX, EXCH, and/or COMP&EXCH synchronization primitive), the LPT 90 determines if there is an entry for the cache line associated with that memory request in response to that memory request. When there is no entry associated with that cache line in the LPT 90, the LPT 90 allocates an entry for that cache line in the LPT 90 and updates the state of the cache line to U. In response to a memory request associated with a cache line that includes the acquire operation or the atomic update operation (e.g., the memory request includes a STCX, EXCH, and/or COMP&EXCH synchronization primitive) and when there is an entry associated with that cache line and the cache line is in the U state, the LPT 90 determines that the cache line is associated with atomic update behavior and does not change the state of that cache line. In the U state, a cache line may be in a migratory state and ownership of the cache line may be migrated from a first node 42 (e.g., the node 42 in which that cache line is cached) to a second node 42. In the event of a memory request for the cache line from the second node 42 while that cache line is in the U state, ownership the cache line may be migrated from the first node 42 to the second processing node 42 and the cache line may be invalidated from the first node 42.

However, in response to a memory request associated with a cache line that includes the release operation (e.g., the memory request includes a STORE synchronization primitive) and the entry indicates that the state of that cache line is U, the LPT 90 determines that the cache line is associated with lock behavior and invalidates the cache line and LPT 90 entry. Thus, the LPT 90 tracks at least one cache line associated with atomic update behavior and assumes that at least one other cache lines without lock prediction data is associated with lock behavior.

Figure 8:
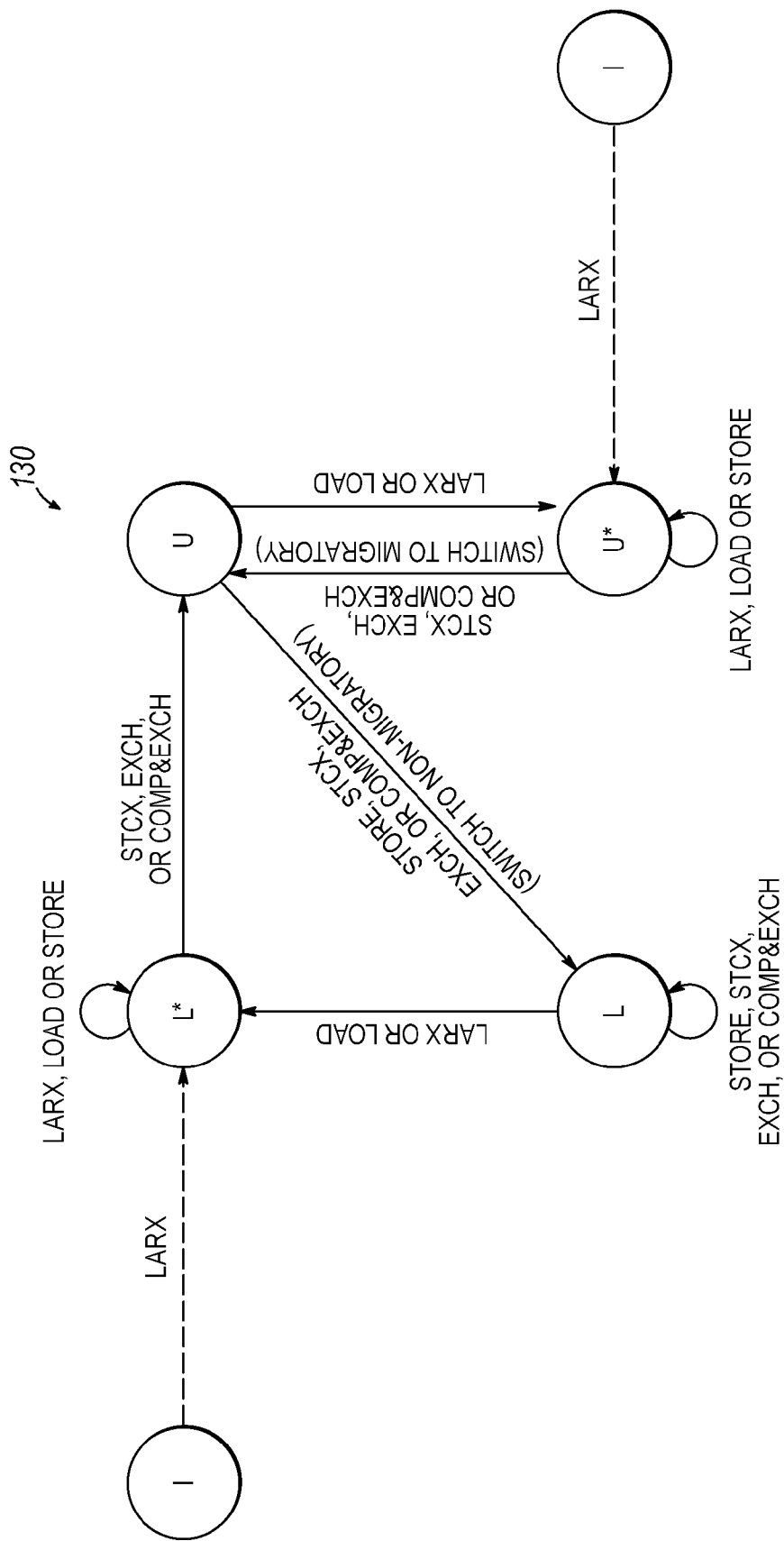
FIG. 8 illustrates an expanded state transition diagram for a cache line that includes five transitory states, the initial state of the cache line being either a transitory state or a potentially locked, unreleased and non-migratory state, the FIG. further illustrating one migration of states as the cache line is subject to synchronization operations by the system of FIG. 2.

FIG. 8 illustrates an expanded state transition diagram 130 for a cache line consistent with embodiments of the invention that includes five transitory states, where the initial state of the cache line is either a transitory state or a non-migratory state. FIG. 8 further illustrates one migration of states as the cache line is subject to synchronization operations. Specifically, FIG. 8 illustrates the I, U, U-star (illustrated as, and hereinafter, the "U*" state), L, and L-star (illustrated as, and hereinafter, the "L*" state) transitory states. In specific embodiments, the expanded state transition diagram 130 illustrates the migration of states of a cache line when that cache line is subject to a first and second release operation with at least one similar synchronization primitive as is used in the acquire operation and/or the atomic update operation. For example, the state transition diagram 130 illustrates that the migration of a state of a cache line may be dependent upon a second release operation (e.g., the second release operation is similar to the acquire operation and/or the atomic update operation except that the release operation includes a second STCX, EXCH, and/or COMP&EXCH synchronization primitive without an intervening LARX or LOAD synchronization primitive) or a "classic" release operation (e.g., a release operation that includes the STORE synchronization primitive). In those embodiments, the LPT 90 may determine that a cache line is associated with lock behavior in response to detecting two successive matching synchronization primitives to that cache line's entry before another acquire operation and/or atomic update operation. Additionally, in those embodiments the LPT 90 may determine that a cache line is associated with lock behavior in response to detecting a STORE synchronization primitive to that cache line's entry before another acquire operation and/or atomic update operation.

As illustrated in FIG. 8, in response to a memory request associated with a cache line that includes a first portion of the acquire operation (e.g., the memory request includes a LARX synchronization primitive), the LPT 90 determines if there is an entry for the cache line associated with that memory request. In some embodiments, when there is no entry associated with the cache line in the LPT 90, the LPT 90 allocates an entry for that cache line in the LPT 90 and updates the state of the cache line to the U* transitory state. In some embodiments, the U* transitory state is a state in which the cache line may be in either a migratory or non-migratory state. Thus, in the event of a memory request for the cache line from the second node 42 while that cache line is in the U* transitory state, ownership of the cache line may be migrated from the first node 42 to the second node 42 and the cache line may be invalidated from the first node 42 if the cache line is in a migratory state, but ownership of the cache line may not be migrated from the first node 42 to the second node 42 if the cache line is in a non-migratory state. As such, the cache line retains its previous migratory or non-migratory state that it had as it proceeded from the U transitory state or I transitory state.

The cache line may be placed the U* transitory state when it is predicted that a majority of the interactions with the cache line will include atomic update behavior. The cache line may also be placed the U* transitory state when it is determined that a majority of the interactions with at least a portion of cache lines from the same memory region (e.g., one, some, or all of the other cache lines from the same memory region) are subject to atomic update behavior. Moreover, the cache line may be placed the U* transitory state when it is determined that a majority of the interactions with the cache lines in the node 42 include atomic update behavior. Finally, the cache line may arbitrarily be placed the U* transitory state. One having ordinary skill in the art and the benefit of this disclosure will appreciate that other considerations may be taken into account to determine that the initial placement of the cache line should be to the U* transitory state.

Also as illustrated in FIG. 8, in response to a memory request associated with a cache line that includes a first portion of the acquire operation, the LPT 90 determines if there is an entry for the cache line associated with that memory request. In those alternative embodiments, when there is no entry associated with the cache line in the LPT 90, the LPT 90 allocates an entry for that cache line in the LPT 90 and updates the state of the cache line to the L* transitory state. In some embodiments, the L* state (which may be similar to the Ls state described above) is a potentially locked and unreleased state, which is a non-migratory state. As such, ownership of the cache line may not be migrated from a first node 42 to a second node 42. Thus, in the event of a memory request for the cache line from the second node 42 while that cache line is in the L* transitory state, ownership of the cache line will not be migrated from the first node 42 to the second node 42.

The cache line may be placed the L* transitory state when it is predicted that a majority of the interactions with the cache line will include lock behavior. The cache line may also be placed the L* transitory state when it is determined that a majority of the interactions with at least a portion of cache lines from the same memory region (e.g., one, some, or all of the other cache lines from the same memory region) are subject to lock behavior. Moreover, the cache line may be placed the L* transitory state when it is determined that a majority of the interactions with the cache lines in the node 42 include lock behavior. Finally, the cache line may arbitrarily be placed the L* transitory state. One having ordinary skill in the art and the benefit of this disclosure will appreciate that other considerations may be taken into account to determine that the initial placement of the cache line should be to the L* transitory state.

For the sake of brevity, and not intending to be limiting, the disclosure regarding transition of states of a cache line will begin from the U* transitory state. One having skill in the art and the benefit of this disclosure will appreciate that the transition may begin from the L* transitory state without departing from the scope of the invention.

As illustrated in FIG. 8, in response to a memory request associated with a cache line that includes the STCX, EXCH, or COMP&EXCH synchronization primitive while that cache line is in the U* transitory state, the LPT 90 determines that the cache line may be associated with atomic update behavior and updates the transitory state of the cache line to U. Additionally, if the cache line has previously been in the non-migratory state and/or was previously invalid, the cache line is placed in a migratory state. As such, ownership of the cache line may be migrated from a first node 42 (e.g., the node 42 in which that cache line is cached) to a second node 42. Thus, in the event of a memory request for the cache line from the second node 42 while that cache line is in the migratory state, ownership of the cache line may be migrated from the first node 42 to the second node 42 and the cache line may be invalidated from the first node 42. In response to a memory request associated with the cache line that includes the STORE, LARX and/or LOAD synchronization primitive while that cache line is in the U* transitory state, the LPT 90 may not care about that synchronization primitive (e.g., a "don't care" situation) and keep the cache line in the U* transitory state. A "don't care" situation may arise because of an error and/or another situation that may be ignored. In response to a memory request associated with a cache line that includes a LARX or LOAD synchronization primitive while that cache line is in the U transitory state, the LPT 90 updates the transitory state of the cache line to U*.

In response to a memory request associated with a cache line that includes a STORE synchronization primitive, or a second STCX, EXCH, and/or COMP&EXCH synchronization primitive, while that cache line is in the U transitory state, the LPT 90 determines that the cache line may be associated with lock behavior and updates the transitory state of the cache line to L. Additionally, if the cache line has previously been in the non-migratory state, the cache line is placed in a locked, unreleased and non-migratory state. As such, ownership of the cache line may not be migrated from a first node 42 to a second node 42. In the event of a memory request for the cache line from the second node 42 when that cache line is in the non-migratory state, a copy of the cache line may be sent to the second node 42 with an indication that the cache line is in the non-migratory state.

In response to a memory request associated with a cache line that includes the LARX or LOAD synchronization primitive while that cache line is in the L transitory state, the LPT 90 determines that the cache line may be associated with lock behavior and updates the transitory state of the cache line to L*. In the L* transitory state, a cache line may be placed in a potentially locked and unreleased state, which is a non-migratory state, or retain its previous non-migratory state. As such, ownership of the cache line may not be migrated from a first node 42 to a second node 42. In response to a memory request associated with a cache line that includes the STORE, STCX, EXCH or COMP&EXCH synchronization primitive while that cache line is in the L transitory state, the LPT 90 may not care about synchronization primitive (e.g., a "don't care" situation) and keep the cache line in the L transitory state.

In response to a memory request associated with a cache line that includes a first STCX, EXCH, or COMP&EXCH synchronization primitive while that cache line is in the L* transitory state, the LPT 90 determines that the cache line may be associated with atomic update behavior and updates the transitory state of the cache line to U. However, the LPT 90 does not change the state of the cache line to the migratory state. In response to a memory request associated with a cache line that includes a STORE, LARX or LOAD synchronization primitive while that cache line is in the L* transitory state, the LPT 90 may not care about synchronization primitive (e.g., a "don't care" situation) and keep the cache line in the L* transitory state.

Thus, as shown in FIG. 8, the LPT 90 may determine the state of a cache line in response to memory requests (either from the node 42 in which that cache line is cached or from a second node 42 of the system 40) and based on whether the memory requests include specific portions of the acquire operation, release operation, and/or atomic update operation as well as first or second STCX, EXCH, and/or COMP&EXCH synchronization primitives. Moreover, the LPT 90 may switch the migratory states of the cache line based upon specific transitions of the cache line, and not based upon which transitory state (e.g., I, U, U*, L, L*) that cache line is in.

With respect to FIG. 8, in the event of a "don't care" situation, the LPT 90 may not keep the cache line in the same transitory state. As such, the LPT 90, in response to a "don't care" situation, may change the transitory state of the cache line to the I transitory state and/or otherwise invalidate the cache line and/or memory region thereof.

FIG. 9 is a flowchart 140 illustrating one embodiment of a sequence of operations that may occur in a node in a shared memory computing system ("system") to update a respective LPT with information predictive of the synchronization operations associated with a cache line. As such, the LPT may be configured to hold lock prediction data associated with a cache line that is predictive of whether that cache line is associated with a release operation. Initially, a memory request associated with a cache line of the system may be detected (block 142). In some embodiments, the memory request may be from a processing unit on the node or from another node of the system. When a memory request is not detected or when the memory request is not associated with a cache line ("No" branch of decision block 142), the sequence of operations may continue to attempt to detect memory requests.

When a memory request associated with a cache line is detected ("Yes" branch of decision block 142), the sequence of operations determines if the memory request includes a synchronization operation (block 144). When the memory request does not include a synchronization operation ("No" branch of decision block 144) the memory request may be ignored (block 146). When the memory request does include a synchronization operation ("Yes" branch of decision block 144), it may be determined whether there is a hit for an entry associated with the cache line that is in turn associated with the memory request (block 148). In some embodiments, the LPT may be a tagged set-associative array that includes an address tag for each entry. In those embodiments, the address tag of the cache line associated with the memory request may be determined and the address tags associated therewith may be queried to determine if an entry associated with that cache line is present. In alternative embodiments, the LPT may be a tagless address-hash-indexed array with entries accessed through a hash index. In those embodiments, the hash index may be queried to determine if there is an LPT entry associated with the cache line. When there is not an LPT hit for the cache line associated with the memory request ("No" branch of decision block 148), it may be determined whether the memory request is a local memory request (block 150). In some embodiments, the node is configured to receive memory requests from each of the remaining plurality of nodes of the system. As such, it may determine those memory requests which are from the node or nodes for which the node is configured to maintain data (e.g., "local" memory requests) and those memory requests which are from remote nodes of the system, including a second node of the system (e.g., "remote" memory requests). Thus, when the memory request is a local memory request ("Yes" branch of decision block 150) retrieval of the cache line associated with the memory request may be attempted (block 152). In some embodiments, retrieval of the cache line associated with the memory request may be attempted with the issuance of a second memory request for the cache line. As such, and in response to the node storing the cache line (block 154), the LPT may create an entry for that cache line (block 156). In some embodiments, when the entry for the cache line is created, the cache line initially has an "Invalid" state.

When the memory request is a remote memory request ("No" branch of decision block 150), it may be determined whether to create an entry for the cache line (block 158). In some embodiments, by creating a LPT entry for a cache line associated with a remote memory request when there is no associated LPT entry, cache lines of other nodes of the system may be tracked. Thus, when it is determined to create an LPT entry for a cache line associated with a remote memory request ("Yes" branch of decision block 158), an entry for that cache line may be created (block 156).

In response to an attempt to retrieve the cache line associated with the memory request (block 152), state information for that cache line may be received when that cache line is retrieved from another node of the system (block 160). When state information for the cache line associated with the memory request is received ("Yes" branch of decision block 160), the state data in the LPT associated with that cache line may be updated (block 162) and the node may return to detecting memory requests (block 142). As such, the node may receive and store a shared copy of a cache line (block 154) that may be locked by another node of the system.

In response to storing the cache line in the node (block 154) and when there is no state information received for the cache line ("No" branch of decision block 160), or in response to an LPT hit for an entry associated with the cache line that is in turn associated with the memory request ("Yes" branch of decision block 148), it may be determined whether the synchronization operation includes an acquire operation or an atomic update operation (block 164). In specific embodiments when the synchronization operation includes an acquire operation or an atomic update operation ("Yes" branch of decision block 164) it may be determined whether the synchronization operation includes a load operation (block 166) and/or a write operation (block 168). When the synchronization operation includes a load operation ("Yes" branch of decision block 166) the lock prediction data for the cache line may be updated to indicate the load operation and that data may be stored in the LPT (block 170) consistent with embodiments of the invention. When the synchronization operation does not include a load operation ("No" branch of decision block 166), it may be determined whether the synchronization operation includes a write operation (block 168). When the synchronization operation includes a write operation ("Yes" branch of decision block 168) the lock prediction data for the cache line may be updated to indicate the write operation and that data may be stored in the LPT (block 172) consistent with embodiments of the invention.

Returning to block 164, when it is determined that the synchronization operation does not include the acquire operation or the atomic update operation ("No" branch of decision block 164) it may be determined whether the synchronization operation includes a release operation (block 174). When the synchronization operation includes a release operation ("Yes" branch of decision block 174), the lock prediction data for the cache line may be updated to indicate the release operation and that data may be stored in the LPT (block 176) consistent with embodiments of the invention.

When it is determined that the synchronization operation does not include a write operation ("No" branch of decision block 168), after updating an entry in the LPT associated with the cache line in response to determining the synchronization operation does include the load operation (block 170), after updating an entry in the LPT associated with the cache line in response to determining the synchronization operation does include the write operation (block 172), after determining that the synchronization operation does not include the release operation ("No" branch of decision block 174), after updating an entry in the LPT associated with the cache line in response to determining the synchronization operation does include the release operation (block 176), after updating after ignoring the memory request (block 146), and/or after updating the state data in the LPT associated with that cache line (block 162), memory requests associated with the cache line may again be detected (block 142).

As illustrated in FIGS. 6-8, the last state of a cache line may be tracked to determine whether that cache line is associated with lock behavior or atomic update behavior. However, the node, or at least one component thereof, may be configured to track the percentage of time that a cache line is associated with lock behavior and/or atomic update behavior. FIG. 10 is a flowchart 190 illustrating an alternative embodiment of a logic flow that may occur in a node of the system to update the LPT with information predictive of the synchronization operations associated with a cache line. At least a portion of the logic flow of FIG. 10 may run concurrently with, sequentially after, or replace the logic flow of FIG. 9. Referring to FIG. 10, the node may be configured to detect a memory request associated with a cache line of the system (block 192). In some embodiments, the memory request may be from a processing unit on the node or from another node of the system. When a memory request is not detected or when the memory request is not associated with a cache line ("No" branch of decision block 192), the node will continue to attempt to detect memory requests.

When a memory request associated with a cache line is detected ("Yes" branch of decision block 192), it may be determined if the memory request includes a synchronization operation (block 194). When the memory request does not include a synchronization operation ("No" branch of decision block 194) the memory request may be ignored (block 196). One having ordinary skill in the art will appreciate that the memory request may be processed by a processing unit or other component of the node. When the memory request does include a synchronization operation ("Yes" branch of decision block 194), it may be determined if there is an LPT hit for an entry associated with the cache line that is in turn associated with the memory request (block 198). In some embodiments, the LPT may be a tagged set-associative array that includes an address tag for each entry. In those embodiments, the node may access the LPT and determine the address tag of the cache line associated with the memory request and query the address tags to determine if an entry associated with that cache line is present. In alternative embodiments, the LPT may be a tagless address-hash-indexed array with entries accessed through a hash index. In those embodiments, the node may access and query the hash index to determine if there is an LPT entry associated with the cache line. When there is not an LPT hit for the cache line associated with the memory request ("No" branch of decision block 198), the memory request may be ignored (block 196).

When there is an LPT hit for an entry associated with the cache line that is in turn associated with the memory request ("Yes" branch of decision block 198), the lock prediction data for that cache line may be updated to indicate the memory request and that data may be stored in the LPT (block 200). In specific embodiments, the lock prediction data may be updated by incrementing a count of the number of memory requests associated with the cache line and that data may be stored with the synchronization operation data for that cache line (block 200). In this manner, the lock prediction data for a cache line may include an indication associated with a plurality of memory requests. It may then be determined whether the memory request is associated with lock behavior (block 202). When the memory request is associated with lock behavior ("Yes" branch of block 202) the lock prediction data for the cache line may be updated to indicate the lock behavior and that data may be stored in the LPT (block 204). In specific embodiments, it may be determined whether the memory request is associated with lock behavior by determining that the memory request includes a release operation as disclosed above in relation to FIG. 9. In specific embodiments, the lock prediction data may be updated to indicate the lock behavior by incrementing a count of the number of memory requests associated with lock behavior that are in turn associated with the cache line and store that data in the synchronization operation data for that cache line (block 204).

When the memory request is not associated with lock behavior ("No" branch of block 202) it may be determined whether the memory request is associated with atomic update behavior (block 206). When the memory request is associated with atomic update behavior ("Yes" branch of block 206) the lock prediction data for the cache line may be updated to indicate the atomic update behavior and that data may be stored in the LPT (block 208). In specific embodiments, it may be determined whether the memory request is associated with atomic update behavior by determining that the memory request does not include a release operation as disclosed above in relation to FIG. 9. In specific embodiments, the lock prediction data may be updated to indicate the atomic update behavior by incrementing a count of the number of memory requests associated with atomic update behavior that are in turn associated with the cache line and store that data in the synchronization operation data for that cache line (block 208).

After updating the lock prediction data for the cache line to indicate lock behavior (block 204), when the memory request is not associated with atomic update behavior ("No" branch of block 206), or after updating the lock prediction data for the cache line to indicate atomic update behavior (block 208), the percentage of memory requests associated with lock behavior and/or atomic update behavior may be computed (block 210). In some embodiments, the percentage of memory requests associated with lock behavior may be computed by dividing the indication of lock behaviors by the indication of memory requests and multiplying that number by one-hundred as is well known in the art. Similarly, the percentage of memory requests associated with atomic update behavior may be computed by dividing the indication of atomic update behaviors by the indication of memory requests and multiplying that number by one-hundred as is well known in the art. After computation, the percentage of memory requests associated with lock behavior and/or atomic update behavior may be stored in the LPT (block 212). After ignoring the memory request (block 196) or storing the percentage of memory requests associated with lock behavior and/or atomic update behavior (block 212), the node may continue to detect memory requests (block 192).

Thus, FIG. 10 is a flowchart illustrating tracking synchronization operations associated with a cache line over time. It is believed that this is advantageous as there may be a first application that locks cache lines when it updates them and a second application that atomically updates cache lines. In this manner, the node may determine whether the cache line is associated with a high percentage of lock behavior or atomic update behavior and adjust the state of the cache line accordingly.

FIG. 11 is a flowchart 220 illustrating one embodiment of a logic flow that may occur in a first node of a system to allow or prohibit the migration of ownership of a cache line to a second node. At least a portion of the logic flow of FIG. 11 may run concurrently with, or sequentially before, the logic flow of FIG. 9 and/or FIG. 10. Referring to FIG. 11, the first node may detect a memory request that includes a synchronization operation issued from the second node (block 222). In specific embodiments, the synchronization operation issued by the second node includes a fetch and/or pre-fetch operation to migrate ownership of a cache line from the first node to the second node. In response to detecting that memory request, the LPT and/or lock prediction data for the cache line associated with the synchronization operation may be accessed (block 224). Thus, it may be determined whether there is an LPT hit for an entry associated with the cache line in turn associated with the synchronization operation (block 226). In response to determining that there is not an LPT hit for such an entry ("No" branch of decision block 226), the first node may ignore the memory request (block 228).

When there is an LPT hit for an entry associated with the cache line that is in turn associated with the synchronization operation ("Yes" branch of decision block 226), the first node may determine whether lock prediction data in that entry is predictive that the cache line is associated with lock behavior, a release operation, and/or a non-migratory state (block 230). In some embodiments, the first node may determine that lock prediction data in the entry associated with the cache line is predictive that the cache line is associated with lock behavior when the lock prediction data indicates that the cache line is in the Us, L, or Ls states. In those embodiments, the lock prediction data is thus predictive that the cache line is associated with the release operation. In alternative embodiments, the first node may determine that lock prediction data in the entry associated with the cache line is predictive that the cache line is associated with atomic update behavior when the lock prediction data indicates that the cache line is in the I, U, or Us states. In those embodiments, the lock prediction data is thus predictive that the cache line is not associated with the release operation. In some embodiments, the first node may determine that lock prediction data in the entry associated with the cache line is predictive that the cache line is associated with lock behavior when the lock prediction data indicates that the cache line is associated with the release operation. In alternative embodiments, the first node may determine that lock prediction data in the entry associated with the cache line is predictive that the cache line is associated with atomic update behavior when the lock prediction data indicates that the cache line is not associated with the release operation. Thus, the lock prediction data is predictive of whether the cache line associated with that lock prediction data is in the migratory or non-migratory states.

When the first node determines that the lock prediction data in the entry associated with the cache line that is in turn associated with the synchronization operation is not predictive that the cache line is associated with lock behavior, a release operation, and/or a non-migratory state ("No" branch of decision block 230), the cache line may be in a migratory state and the first node may migrate ownership of the cache line to the second node (e.g., transfer the cache line to the second node), invalidate the cache line in the first node, and/or invalidate the LPT entry associated with that cache line (block 232). However, when first node determines that the lock prediction data in the entry associated with the cache line that is in turn associated with the synchronization operation is predictive that the cache line is associated with lock behavior, a release operation, and/or a non-migratory state ("Yes" branch of decision block 230), the cache line may be in a non-migratory state and the first node may prohibit ownership migration, copy the cache line and send the copy of the cache line to the second node, and/or indicate that the cache line is associated with lock behavior, a release operation, and/or a non-migratory state (block 234). Thus, in response to the lock prediction data predicting that the cache line is associated with atomic update behavior and is thus in a migratory state, the first node may migrate ownership of the cache line from the first node to the second node in response to a memory request from the second node. However, in response to the lock prediction data predicting that the cache line is associated with lock behavior and is thus in a non-migratory state, the first node may prohibit ownership migration of the cache line from the first node to the second node in response to a memory request from the second node.

While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, the computer of FIG. 1 and the system of FIG. 2 may include additional components, such as displays, I/O devices, routers, and/or other components without departing from the scope of the invention. Moreover, each of the nodes of the system of FIG. 2 may be configured with more than one processing unit as is well known in the art. Additionally, the circuit arrangement of FIG. 4 may include memory controllers, additional network interfaces, additional cache levels (e.g., an L3 and/or L4 caches) and/or other components without departing from the scope of the invention, while the LPT of FIG. 5 may include additional information without departing from the scope of the invention.

Furthermore, one skilled in the art will further appreciate that the LPT may be placed within different components without departing from the scope of the invention. For example, the LPT may be disposed in the L1 cache, outside of the L2 cache but inside the processing unit of a processing node, outside the processing unit but inside a processing node and in communication with the core and/or network interface(s) of that processing node, and/or in the memory of a processing node.

Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the present invention. For example, although the blocks of FIGS. 9-11 are illustrated as being in a specific order, any of the blocks of FIGS. 9-11 may be combined or re-ordered without departing from the scope of the invention.

Additionally, any of the blocks of FIGS. 9-11 may be performed by a node or a component therein, including an LPT that may be configured in that node. Specifically, control logic may be coupled to the LPT data structure to perform some, or all, of the blocks of any or all of FIGS. 9-11. Accordingly, departures may be made from such details without departing from the spirit or scope of applicants' general inventive concept.

Other modifications will be apparent to one of ordinary skill in the art. Therefore, the invention lies in the claims hereinafter appended.

What is claimed is:

1. A method to control ownership of a cache line in a shared memory computing system of the type that includes a plurality of nodes, the method comprising, in a first node among the plurality of nodes:
   storing a plurality of cache lines for the first node in a cache;
   in response to storing a cache line from the plurality of cache lines, updating a hardware-based lock prediction data structure with data associated with the cache line, wherein at least a portion of the hardware-based lock prediction data structure includes lock prediction data predictive of whether the cache line is associated with a release operation;
   in response to a first memory request issued from the first node and associated with the cache line, determining whether the first memory request includes a first synchronization operation that uses the release operation to control access to the cache line or a second synchronization operation that does not use the release operation to control access to the cache line, wherein the first synchronization operation includes at least one acquire operation and the release operation to update the cache line, and wherein the second synchronization operation atomically updates the cache line;
   updating the hardware-based lock prediction data structure with a respective indication of whether the first memory request includes the first synchronization operation such that the cache line is placed in a non-migratory state or whether the first memory request includes the second synchronization operation such that the cache line is placed in a migratory state, wherein the non-migratory state prevents migrating ownership of the cache line from the first node to a second node among the plurality of nodes, and wherein the migratory state allows migrating ownership of the cache line from the first node to the second node; and
   in response to a second memory request issued from the second node and also associated with the cache line, accessing the hardware-based lock prediction data structure to determine whether to migrate ownership of the cache line from the first node to the second node based on the hardware-based lock prediction data structure such that ownership of the cache line is migrated and the cache line is invalidated from the cache of the first node in response to the second memory request when the hardware-based lock prediction data structure predicts that the cache line is in the migratory state and ownership of the cache line is not migrated and a read-only copy of the cache line is sent to the second node in response to the second memory request when the hardware-based lock prediction data structure predicts that the cache line is in the non-migratory state.

2. A method to control ownership of a cache line in a shared memory computing system of the type that includes a plurality of nodes, the method comprising, in a first node among the plurality of nodes:

in response to a first memory request, updating lock prediction data for a cache line associated with the first memory request within a hardware-based lock prediction data structure resident in the first node, wherein at least a portion of the lock prediction data is predictive of whether the cache line associated with the first memory request is further associated with a release operation, and wherein the lock prediction data structure includes a tagged set-associative array; and in response to a second memory request that is associated with the cache line and issued by a second node among the plurality of nodes, accessing the lock prediction data in the lock prediction data structure and determining whether to transfer ownership of the cache line from the first node to the second node based at least in part on the accessed lock prediction data.

3. The method of claim 2, wherein updating the lock prediction data for the cache line associated with the first memory request includes:

in response to determining that a release operation for the cache line associated with the first memory request followed the first memory request, updating the lock prediction data for the cache line to indicate the release operation, wherein the indication of the release operation is predictive that the cache line is associated with the release operation.

4. The method of claim 2, wherein the accessed lock prediction data predicts that the cache line associated with the first and second memory requests is associated with the release operation.

5. The method of claim 4, further comprising:

in response to the accessed lock prediction data predicting that the cache line associated with the first and second memory requests is associated with the release operation, preserving ownership of the cache line with the first node.

6. The method of claim 5, wherein preserving ownership of the cache line with the first node further comprises:

copying the cache line and transferring a read-only copy of the cache line to the second node.

7. The method of claim 4, wherein the accessed lock prediction data includes data associated with a plurality of release operations of a plurality of memory requests associated with the cache line, wherein the accessed lock prediction data predicts that the cache line associated with the first and second memory requests is further associated with the release operation.

8. The method of claim 3, wherein the accessed lock prediction data predicts that the cache line associated with the first and second memory requests is not associated with the release operation.

9. The method of claim 2, wherein the first memory request includes at least one acquire operation and at least one release operation.

10. The method of claim 2, wherein the first memory request includes at least one release operation such that lock prediction data predicts that the cache line associated with the first memory request is further associated with the release operation.

11. The method of claim 2, wherein the lock prediction data for the cache line associated with the first memory request includes validity data associated with the cache line, address data for the cache line, state data for the cache line, and replacement policy data for the cache line.

12. The method of claim 11, wherein the state data indicates a state selected from the group consisting of an invalid state, an atomically updated state, a potentially atomically updated state, a locked state, and a potentially-locked state.

13. A method to control ownership of a cache line in a shared memory computing system of the type that includes a plurality of nodes, the method comprising, in a first node among the plurality of nodes:

in response to a first memory request, updating lock prediction data for a cache line associated with the first memory request within a hardware-based lock prediction data structure resident in the first node, wherein at least a portion of the lock prediction data is predictive of whether the cache line associated with the first memory request is further associated with a release operation;

in response to a second memory request that is associated with the cache line and issued by a second node among the plurality of nodes, accessing the lock prediction data in the lock prediction data structure and determining whether to transfer ownership of the cache line from the first node to the second node based at least in part on the accessed lock prediction data;

in response to the accessed lock prediction data predicting that the cache line associated with the first and second memory requests is not associated with the release operation, migrating the cache line and ownership of the cache line from the first node to the second node; and invalidating the cache line from a cache of the first node, wherein the accessed lock prediction data predicts that the cache line associated with the first and second memory requests is not associated with the release operation, and wherein updating the lock prediction data for the cache line associated with the first memory request includes:

in response to determining that a release operation for the cache line associated with the first memory request followed the first memory request, updating the lock prediction data for the cache line to indicate the release operation, wherein the indication of the release operation is predictive that the cache line is associated with the release operation.

14. The method of claim 9, wherein the lock prediction data structure includes a tagless address-hash-indexed array.

15. The method of claim 14, wherein the lock prediction data for the cache line associated with the first memory request includes state data for the cache line.

16. The method of claim 15, wherein the state data indicates a state selected from the group consisting of an invalid state, an atomically updated state, a potentially atomically updated state, a locked state, and a potential-lock state.

17. A circuit arrangement comprising:

a cache configured to store a plurality of cache lines;

a hardware-based lock prediction data structure configured to store lock prediction data for a cache line stored in the cache and associated with a first memory request, wherein at least a portion of the lock prediction data is predictive of whether the cache line associated with the first memory request is further associated with a release operation, wherein the hardware-based lock prediction data structure includes an address-hashed-index data structure;

control logic coupled to the lock prediction data structure configured to, in response to a second memory request associated with the cache line, access the lock prediction data in the lock prediction data structure to determine whether to transfer ownership of the cache line based at least in part on the accessed lock prediction data; and a hash index operable to be accessed to determine an entry in the hardware-based lock prediction data structure associated with the cache line.

18. A shared memory computing system of the type that includes a plurality of nodes each comprising the circuit arrangement of claim 17.

19. The shared memory computing system of claim 18, wherein the second memory request is issued from a second node among the plurality of nodes, and wherein a first node is configured to determine whether to transfer ownership of the cache line from the first node to the second node based at least in part on the accessed lock prediction data.

* * * * *